United States Patent
Chen et al.

(10) Patent No.: US 9,001,780 B2
(45) Date of Patent: Apr. 7, 2015

(54) PHYSICAL LAYER ISSUES RELATED TO MULTI-TA GROUP SUPPORT

(71) Applicant: QUALCOMM Incorporated, San Diego, CA (US)

(72) Inventors: Wanshi Chen, San Diego, CA (US); Jelena M. Damnjanovic, San Diego, CA (US); Peter Gaal, San Diego, CA (US); Hao Xu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 13/741,226

(22) Filed: Jan. 14, 2013

(65) Prior Publication Data
US 2013/0195084 A1 Aug. 1, 2013

Related U.S. Application Data

(60) Provisional application No. 61/591,827, filed on Jan. 27, 2012, provisional application No. 61/594,980, filed on Feb. 3, 2012.

(51) Int. Cl.
*H04W 72/04* (2009.01)
*H04L 5/00* (2006.01)
*H04W 56/00* (2009.01)

(52) U.S. Cl.
CPC ........... *H04W 72/0413* (2013.01); *H04L 5/001* (2013.01); *H04L 5/0044* (2013.01); *H04L 5/0048* (2013.01); *H04L 5/0053* (2013.01);
(Continued)

(58) Field of Classification Search
USPC .................. 370/329, 330, 341; 455/450, 451, 455/452.1, 452.2, 509
See application file for complete search history.

(56) References Cited

U.S. PATENT DOCUMENTS

| 2011/0243102 A1 | 10/2011 | Sebire et al. |
| 2012/0063425 A1 | 3/2012 | Wang et al. |

(Continued)

FOREIGN PATENT DOCUMENTS

WO 2012041422 A2 4/2012

OTHER PUBLICATIONS

Panasonic, Uplink Signaling for Carrier Aggregation Enhancement (R1-113802), Nov. 14, 2011-Nov. 18, 2011, 3GPP TSG-RAN WG1 Meeting #67, San Francisco, USA, 3 pages.*

(Continued)

*Primary Examiner* — Hoon J Chung
(74) *Attorney, Agent, or Firm* — Arent Fox LLP

(57) ABSTRACT

A method, an apparatus, and a computer program product for wireless communication are provided. The apparatus may determine a number of uplink timing groups configured for a plurality of component carriers, and determine whether to transmit at least one of data or control information on one or more first component carriers of the plurality of component carriers concurrently with sounding reference signals (SRS) on one or more second component carriers of the plurality of component carriers based at least in part on the number of uplink timing groups. When only one uplink timing group is determined, the SRS is transmitted in a symbol on the one or more second component carriers if the data and control information is not transmitted in the symbol. When two uplink timing groups are determined SRS may be transmitted on the second component carriers concurrently with data or control information on the component carriers.

57 Claims, 18 Drawing Sheets

(52) U.S. Cl.
CPC .......... *H04W 56/00* (2013.01); *H04W 56/0045* (2013.01)

(56) References Cited

U.S. PATENT DOCUMENTS

2012/0218988 A1  8/2012  Xu et al.
2012/0250520 A1  10/2012  Chen et al.

OTHER PUBLICATIONS

CATT: "Simultaneous transmission of multiple uplink channels in LTE-A Rel-11", 3GPP DRAFT; R1-113721, 3rd Generation Partnership Project (3GPP), Mobile Competence Centre; 650, Route Des Lucioles; F-06921 Sophia-Antipolis Cedex; France, vol. Ran WG1, No. San Francisco, USA; 20111114-20111118, Nov. 8, 2011, XP050561841.
Huawei et al., "Simultaneous transmission of SRS and PUCCH", 3GPP Draft; R1-114086, 3rd Generation Partnership Project (3GPP), Mobile Competence Centre; 650, Route Des Lucioles; F-06921 Sophia—Antipolis Cedex; France, vol. RAN WG1, No. San Francisco, USA; 20111114-20111118, Nov. 8, 2011, XP050562066.
Huawei, et al., "The Multiple Time Advances in Carrier Aggregation", 3GPP Draft; R2-111953 The Multiple Time Advances in Carrier Aggregation, 3rd Generation Partnership Project (3GPP), Mobile Competence Centre ; 650, Route Des Lucioles ; F-06921 Sophia-Antipolis Cedex ; France, val. RAN WG2, No. Shanghai, China; 20110411, Apr. 5, 2011, XP050494488.
International Search Report and Written Opinion—PCT/US2013/021578—ISA/EPO—Jul. 5, 2013.
NTT Docomo: "Issues on UL Simultaneous Transmission for Multiple TA", 3GPP Draft; R1-114070 UL CA for Multiple TA, 3rd Generation Partnership Project (3GPP), Mobile Competence Centre; 650, Route Des Lucioles; F-06921 Sophia-Antipolis Cedex; France, vol. Ran WG1, No. San Francisco, USA; 20111114-20111118, Nov. 10, 2011, XP050562404.
Partial International Search Report—PCT/US2013/021578—ISA/EPO—May 13, 2013.
Renesas Mobile Europe Ltd, "Further considerations on calculated timing advance for carrier aggregation", 3GPP Draft; R4-114253, 3rd Generation Partnership Project (3GPP), Mobile Competence Centre; 650, Route Des Lucioles; F-06921 Sophia-Antipolis Cedex; France, val. RAN WG4, No. Athens, Greece; 20110822, Aug. 17, 2011, XP050543351.

* cited by examiner

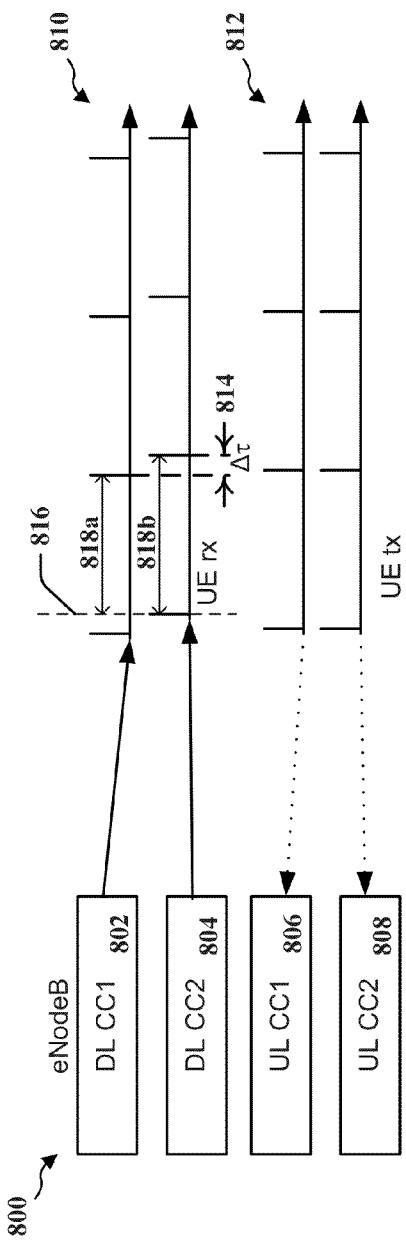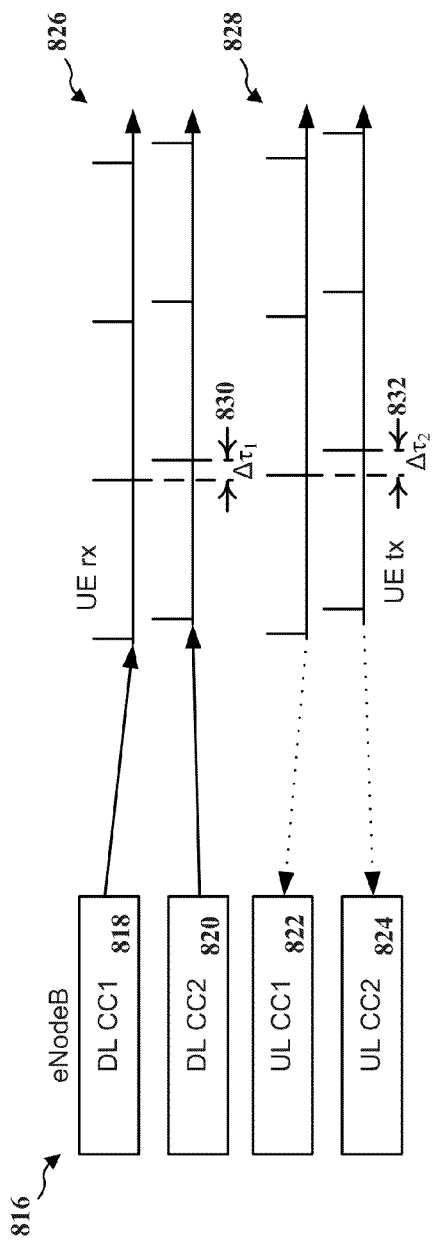
FIG. 8A
FIG. 8B

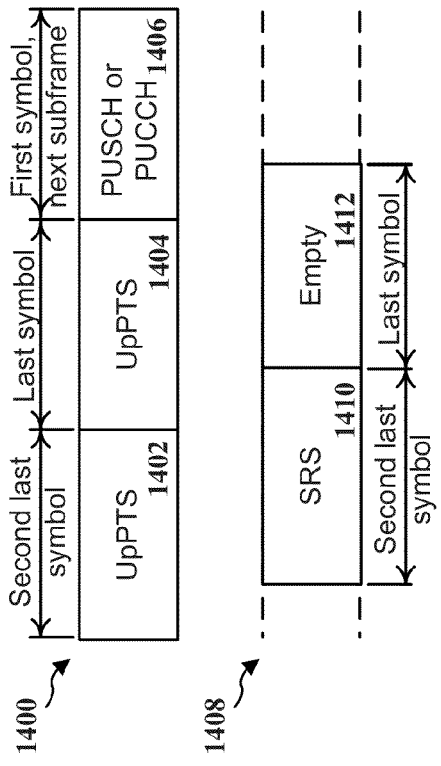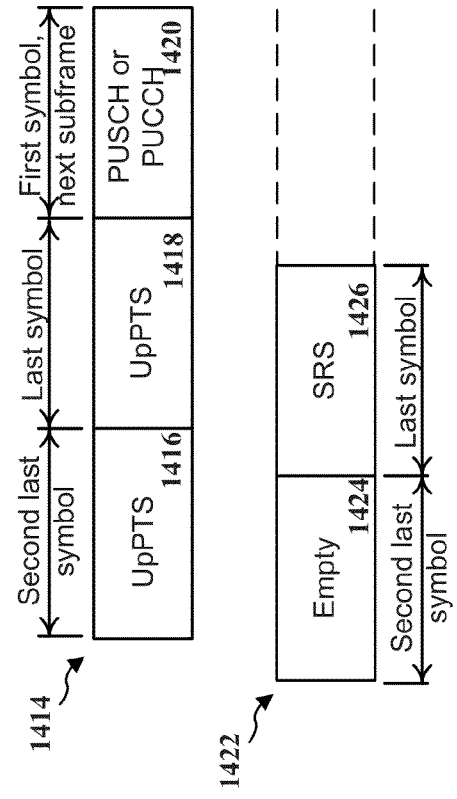
FIG. 14A
FIG. 14B

PHYSICAL LAYER ISSUES RELATED TO MULTI-TA GROUP SUPPORT

CROSS-REFERENCE TO RELATED APPLICATION(S)

This application claims the benefit of U.S. Provisional Application Ser. No. 61/591,827, entitled "Physical Layer Issues Related To Multi-TA Group Support" and filed on Jan. 27, 2012, and claims the benefit of U.S. Provisional Application Ser. No. 61/594,980, entitled "Physical Layer Issues Related To Multi-TA Group Support" and filed on Feb. 3, 2012, both of which are expressly incorporated by reference herein in its entirety.

BACKGROUND

1. Field

Aspects of the present disclosure relate generally to wireless communication systems, and more particularly, to timing issues associated with multiple timing advance groups.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Techniques for resolving physical layer issues in wireless communication systems which define multiple timing advance groups are described herein. In an aspect of the disclosure, a method, a computer program product, and an apparatus are provided. The apparatus may determine a number of uplink timing groups configured for a plurality of component carriers, and determine whether to transmit at least one of data or control information on one or more first component carriers of the plurality of component carriers concurrently with sounding reference signals (SRS) on one or more second component carriers of the plurality of component carriers based at least in part on the number of uplink timing groups.

In an aspect of the disclosure, the number of uplink timing groups is determined based on a higher layer signaling configuration.

In an aspect of the disclosure, only one uplink timing group is determined, and the SRS is transmitted in a symbol on the one or more second component carriers when the at least one of the data or the control information is not transmitted in the symbol on the one or more first component carriers. The SRS may be withheld from transmission in the symbol on the one or more second component carriers when the at least one of the data or the control information is transmitted in the symbol on the one or more first component carriers.

In an aspect of the disclosure, at least two uplink timing groups are determined and further comprising transmitting SRS on the one or more second component carriers concurrently with at least one of data or control information on the one or more first component carriers, when the one or more first component carriers and the one or more second component carriers comprise different component carriers. The one or more first component carriers and the one or more second component carriers may be associated with a same uplink timing group. The one or more first component carriers and the one or more second component carriers may be associated with different uplink timing groups. The determination of whether to transmit the at least one of the data or the control information on the one or more first component carriers concurrently with the SRS on the one or more second component carriers may be based on whether a user equipment (UE) is power limited from transmitting the at least one of the data or the control information concurrently with the SRS.

In an aspect of the disclosure, the SRS and the at least one of the data or the control information may be transmitted concurrently when the UE is not power limited. The SRS may not be transmitted concurrently with the at least one of the data or the control information when the UE is power limited.

In an aspect of the disclosure, information may be transmitted to an evolved Node B (eNB) indicating a difference between uplink timing associated with the one or more first component carriers and uplink timing associated with the one or more second component carriers.

In an aspect of the disclosure, a timing advance command may be received for at least one of the plurality of component carriers. It may be determined whether to apply the timing advance command based on a difference between uplink timing of the one or more first component carriers and uplink timing of the one or more second component carriers after application if the timing advance command is applied. The timing advance command may be for the one or more first component carriers, and the timing advance command may be applied to uplink timing of the one or more first component carriers. The uplink timing of the first and/or second component carriers may be shifted when a difference between the uplink timing of the one or more first component carriers and the uplink timing of the one or more second component carriers is greater than a threshold. Uplink timing may be shifted to obtain a difference between the uplink timing of the one or more first component carriers and the uplink timing of the one or more second component carriers that is less than or equal to the threshold. The timing advance command may be applied to the uplink timing of the first or second component carriers.

In an aspect of the disclosure, only the uplink timing of one of the first and second component carriers is shifted when the difference between the uplink timing of the one or more first component carriers and the uplink timing of the one or more second component carriers is greater than the threshold. Various aspects and features of the disclosure are described in further detail below.

BRIEF DESCRIPTION OF THE DRAWINGS

FIG. 8A illustrates asynchronous downlink component carrier timing and synchronous uplink component carrier timing.

FIG. 8B component carrier timing and for asynchronous downlink and uplink component carriers.

FIG. 14A illustrates an example of concurrent transmission of SRS with UpPTS in the presence of a timing offset between TA Groups.

FIG. 14B illustrates another example concurrent transmission of SRS with UpPTS in the presence of a timing offset between TA Groups.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA; cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
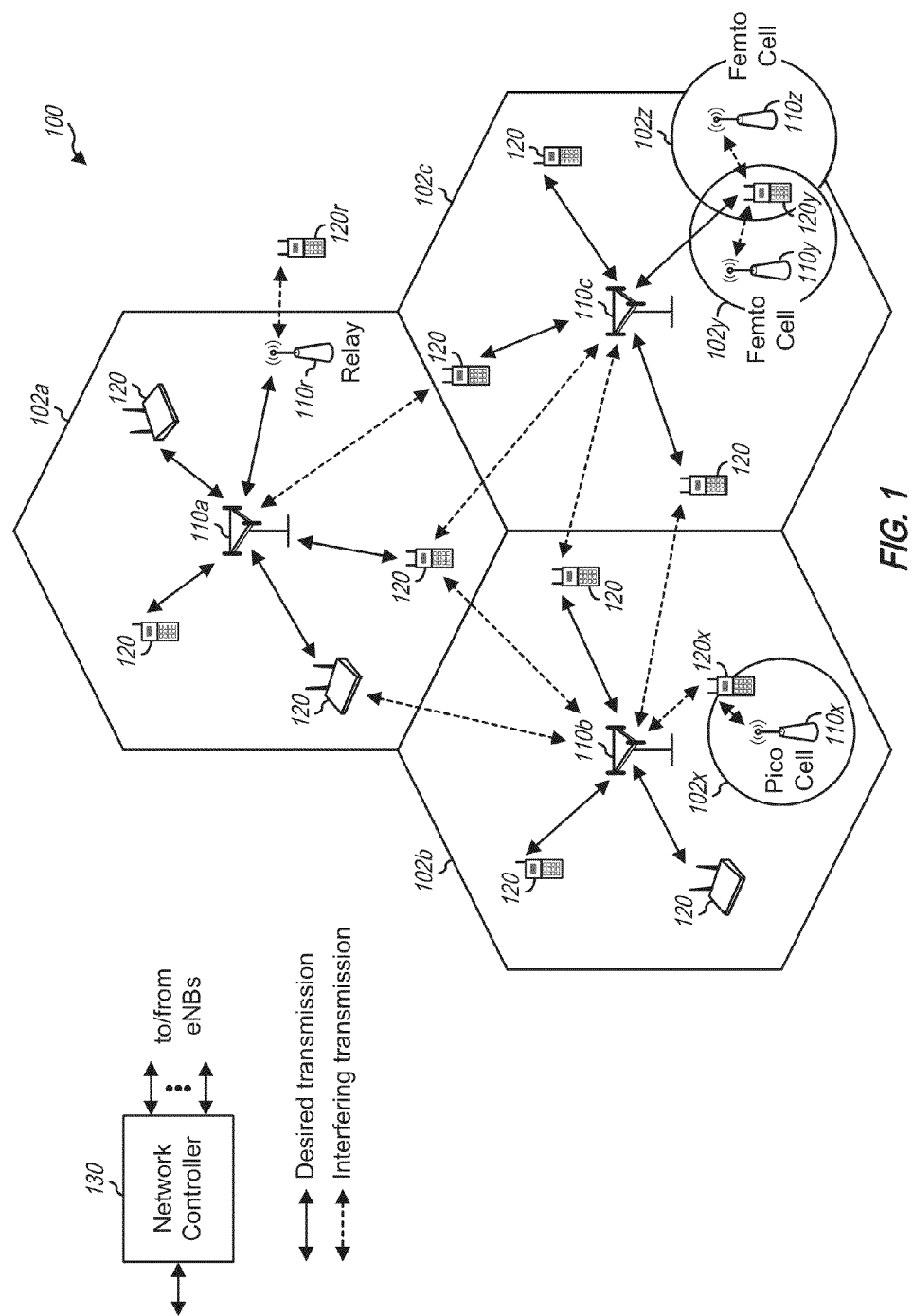
FIG. 1 is a block diagram conceptually illustrating an example of a telecommunications system.

FIG. 1 shows a wireless communication network 100, which may be an LTE network. The wireless network 100 may include a number of evolved Node Bs (eNBs) 110 and other network entities. An eNB may be a station that communicates with the UEs and may also be referred to as a base station, an access point, etc. A Node B is another example of a station that communicates with the UEs.

Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
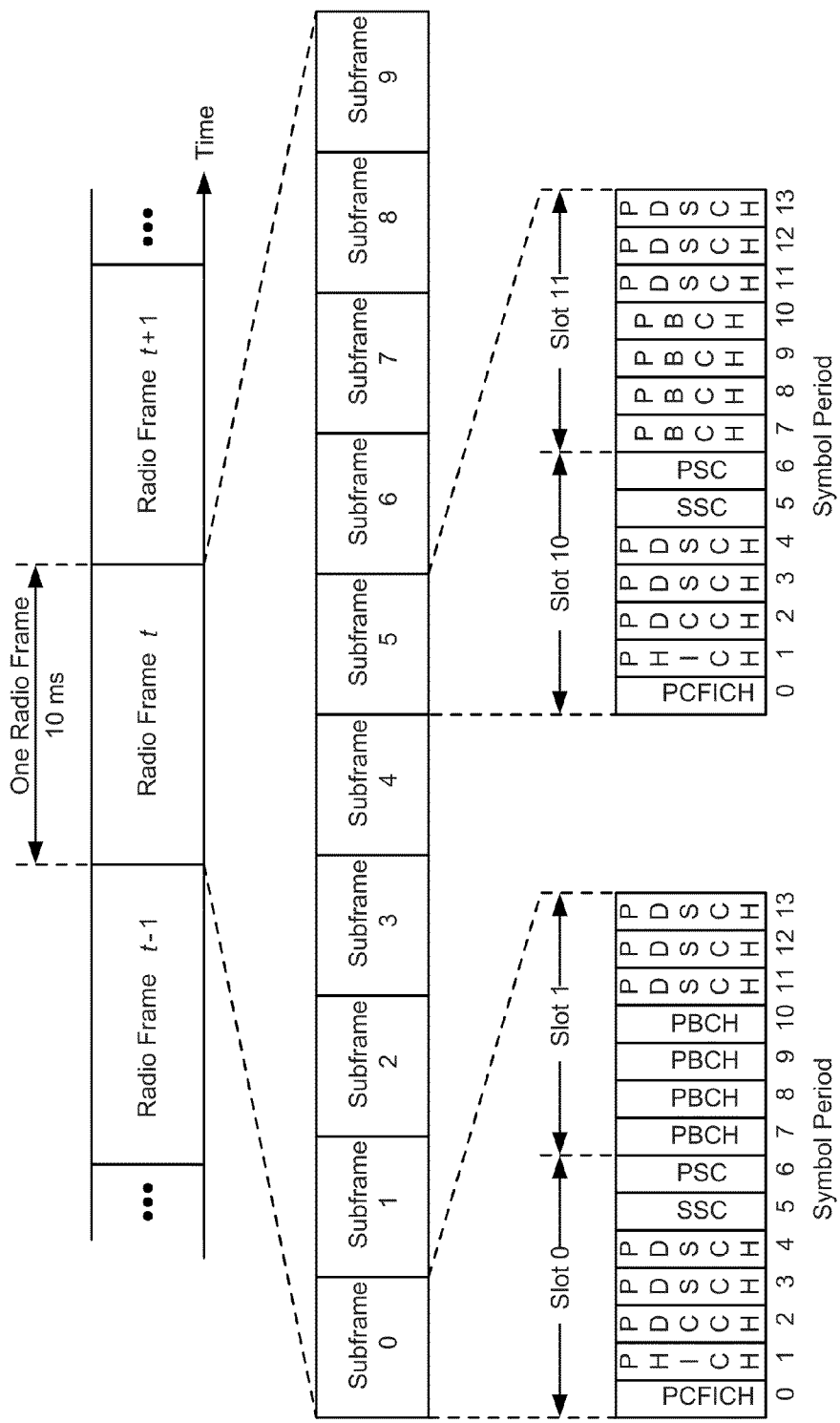
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
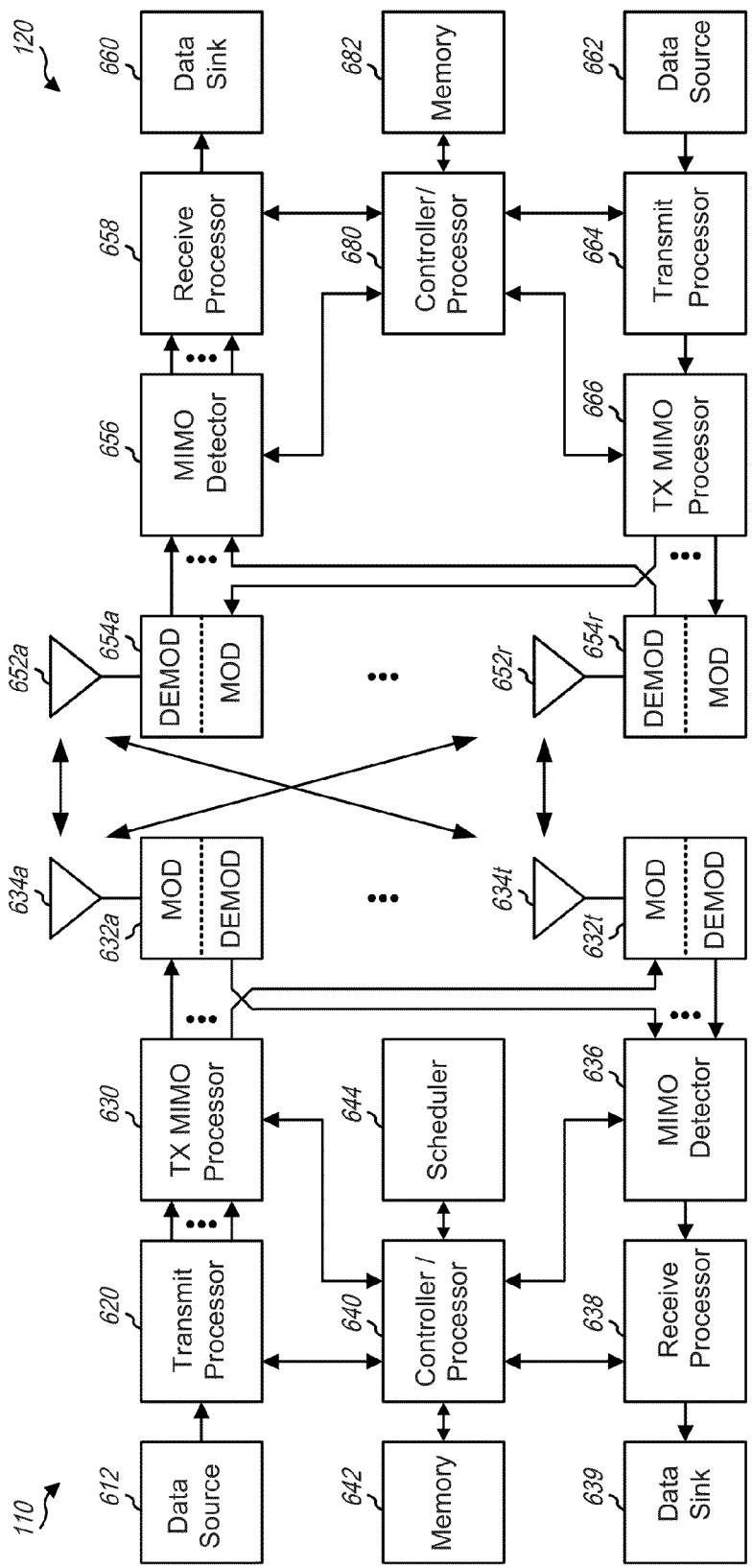
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 634a through 634t, and the UE 120 may be equipped with antennas 652a through 652r.

At the base station 110, a transmit processor 620 may receive data from a data source 612 and control information from a controller/processor 640. The control information may be for the PBCH, PCFICH, PHICH, PDCCH, etc. The data may be for the PDSCH, etc. The processor 620 may process (e.g., encode and symbol map) the data and control information to obtain data symbols and control symbols, respectively. The processor 620 may also generate reference symbols, e.g., for the PSS, SSS, and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 120, the antennas 652a through 652r may receive the downlink signals from the base station 110 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 120 to a data sink 660, and provide decoded control information to a controller/processor 680.

On the uplink, at the UE 120, a transmit processor 664 may receive and process data (e.g., for the PUSCH) from a data source 662 and control information (e.g., for the PUCCH) from the controller/processor 680. The processor 664 may also generate reference symbols for a reference signal. The symbols from the transmit processor 664 may be precoded by a TX MIMO processor 666 if applicable, further processed by the modulators 654a through 654r (e.g., for SC-FDM, etc.), and transmitted to the base station 110. At the base station 110, the uplink signals from the UE 120 may be received by the antennas 634, processed by the demodulators 632, detected by a MIMO detector 636 if applicable, and further processed by a receive processor 638 to obtain decoded data and control information sent by the UE 120. The processor 638 may provide the decoded data to a data sink 639 and the decoded control information to the controller/processor 640.

The controllers/processors 640 and 680 may direct the operation at the base station 110 and the UE 120, respectively. The processor 640 and/or other processors and modules at the base station 110 may perform or direct the execution of various processes for the techniques described herein. The processor 680 and/or other processors and modules at the UE 120 may also perform or direct the execution of the functional blocks illustrated in FIGS. 4 and 5, and/or other processes for the techniques described herein. The memories 642 and 682 may store data and program codes for the base station 110 and the UE 120, respectively. A scheduler 644 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 680, the memory 682, the receive processor 658, the MIMO detector 656, the demodulators 654a, and the antennas 652a configured to perform the functions recited by the aforementioned means. In another aspect, the aforementioned means may be a module or any apparatus configured to perform the functions recited by the aforementioned means.

Carrier Aggregation

LTE-Advanced UEs use spectrum up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 4:
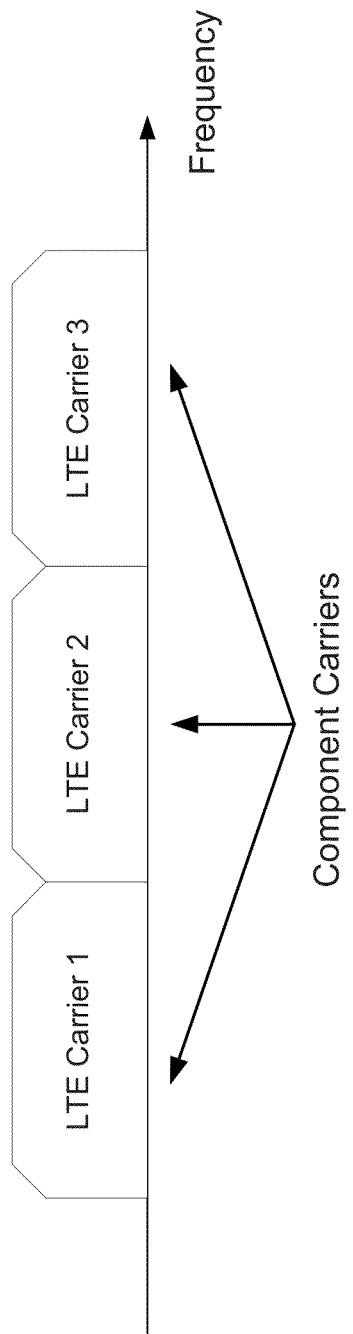
FIG. 4 discloses a continuous carrier aggregation type.
Figure 5:
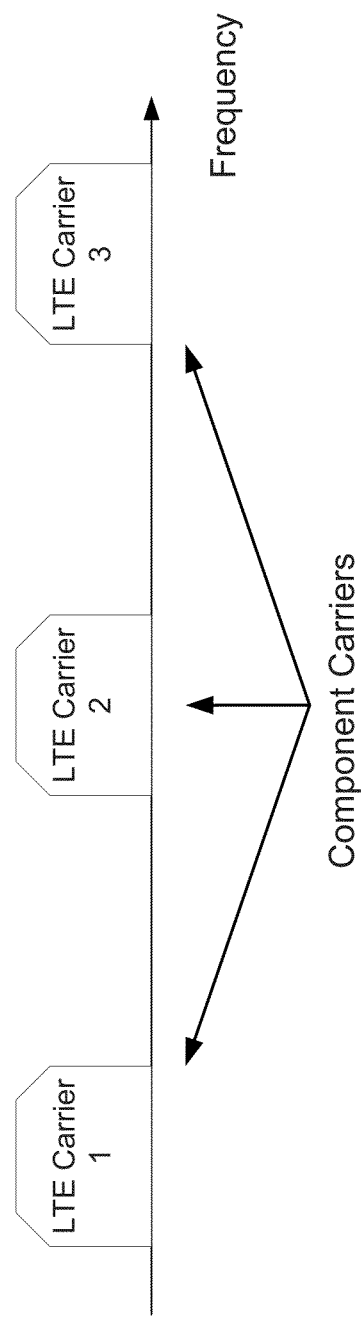
FIG. 5 discloses a non-continuous carrier aggregation type.

For the LTE-Advanced mobile systems, two types of carrier aggregation (CA) methods have been proposed, continuous CA and non-continuous CA. They are illustrated in FIGS. 4 and 5. Non-continuous CA occurs when multiple available component carriers are separated along the frequency band (FIG. 5). On the other hand, continuous CA occurs when multiple available component carriers are adjacent to each other (FIG. 4). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the evolved NodeB (eNB) has fixed transmitting power on each component carrier, the effective coverage or supportable modulation and coding of each component carrier may be different.

Data Aggregation Schemes

Figure 6:
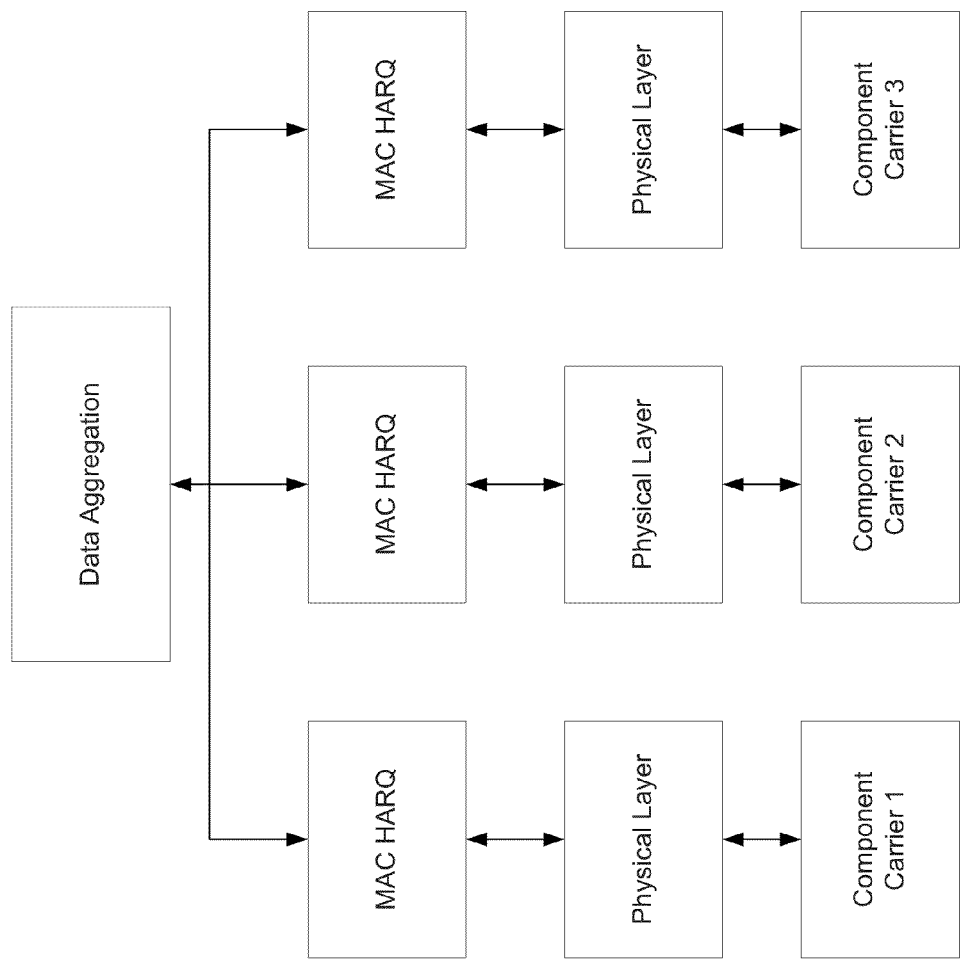
FIG. 6 discloses MAC layer data aggregation.

FIG. 6 illustrates aggregating transmission blocks (TBs) from different component carriers at the medium access control (MAC) layer for an International Mobile Telecommunication (IMT) Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers can be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for a UE that complies with International Mobile Telecommunications-Advanced (IMT-Advanced) requirements. However, reserving sufficient system resources (i.e., component carriers with good transmission quality) for the incoming UE with specific CA configurations and quality of service (QoS) requirements may be challenging for the next eNB. The reason is that the channel conditions of two (or more) adjacent cells (eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). The UE may provide control signals such as Acknowledged/Not Acknowledged (ACK/NAK), channel quality indicator (CQI) and scheduling request (SR) in the primary channel using a physical uplink control channel (PUCCH). Signaling and payload may be transmitted both on the downlink by the eNB to the UE, and on the uplink by the UE to the eNB.

In some embodiments, there may be multiple primary carriers. In addition, secondary carriers may be added or removed without affecting the basic operation of the UE, including physical channel establishment and radio link failure RLF procedures which are layer 2 procedures, such as those described in the 3GPP technical specification 36.331 for the LTE RRC protocol.

Figure 7:
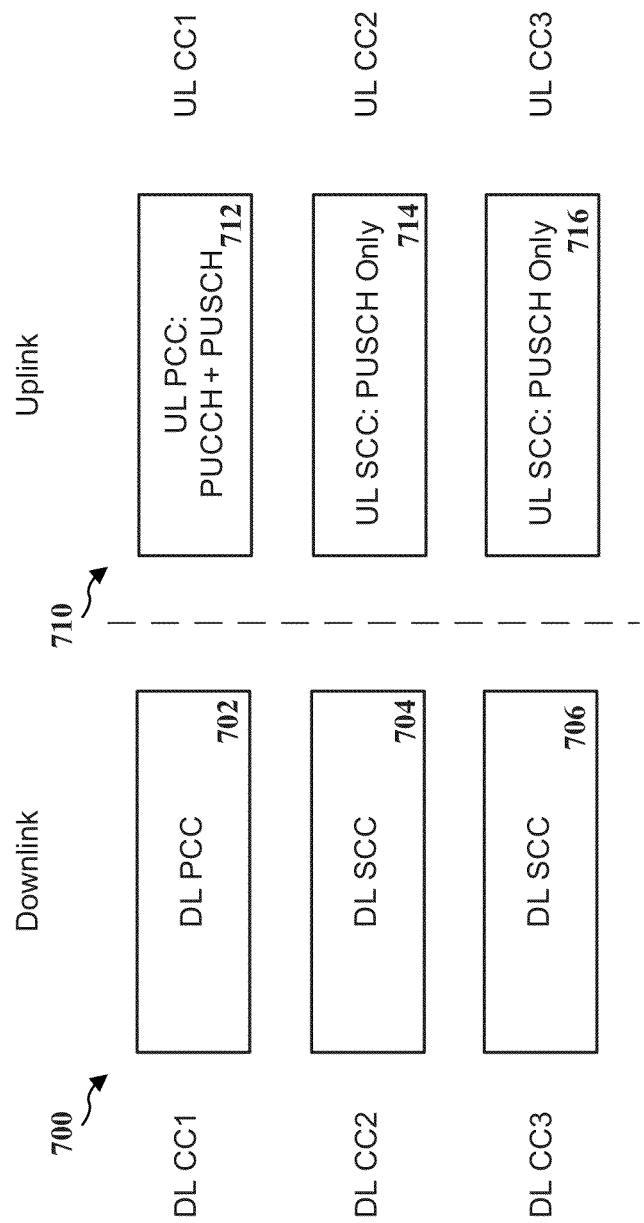
FIG. 7 is a block diagram illustrating a configuration of component carriers.

A plurality of component carriers may be defined for a UE, including a designated primary carrier and one or more secondary carriers. FIG. 7 illustrates one configuration of downlink component carriers 700 and uplink component carriers 710. Uplink primary carrier 712 may be semi-statically configured by a higher level protocol module. Primary carrier 712 may include a PUCCH to transmit control signals such as ACK/NAK, CQI, and SR. Typically a PUCCH is not transmitted in secondary carriers 714 or 716. Primary carrier 712 may support ACK/NAK transmission for up to 5 downlink component carriers.

Uplink carriers 712, 714, 716 may be transmitted asynchronously or synchronously. Two or more of uplink carriers 712, 714, and 716 are typically synchronous when transmitted in the same subband. Two or more Uplink carriers 712, 714, and 716 may be transmitted synchronously when a single timing advance (TA) command is used to control their timing. The transmission of two or more uplink carriers 712, 714, and 716 may be considered to be asynchronous with respect to one another when the transmission of one of the carriers lags the transmission of another of the carriers.

Transmission time of one or more of downlink component carriers 702, 704, and 706 may be offset relative to the other downlink carriers. A UE may be configured to tolerate timing differences in received downlink carriers, including differences in timing that occur between carriers transmitted in different bands (inter-band non-continuous carrier aggregation). FIG. 8A illustrates component carrier timing 800 for asynchronous downlink carriers 810 and synchronous uplink carriers 812. As depicted, the UE transmits carriers 806 and 808 synchronously and receives carriers 802 and 804 with a timing difference (offset $\Delta_t$) 814 between carriers 802 and 804. Timing difference 814 can be quantified as the time difference between start (or end) of corresponding symbols in two component carriers 802 and 804. Timing difference 814 can be calculated as a delay time by subtracting a time value associated with component carrier 802 or 804 from a corresponding time value of the other component carrier 804 or 802 to obtain a signed difference time value where the sign indicates the timing order of component carriers 802 and 804. The sign of the delay time may indicate which of carriers 802 and 804 leads (or lags) the other with respect to a reference time that may be related to transmission timing or that may be arbitrarily set by the UE. For example, the UE may use a reference time 816 that corresponds to the beginning or end of a received frame, whereby the timing difference 814 may be determined by expressing the arrival time of component carriers 802 and 804 as elapsed times 818a and 818b with respect to the reference time 816. The timing difference 814 may then be calculated by simple subtraction of elapsed time 818a from elapsed time 818b to obtain a signed time quantity, where the sign is negative if component carrier 802 lags component carrier 804, where the sign is positive if component carrier 802 leads component carrier 804, and where the timing difference 814 is zero if the component carriers 802 and 804 arrive at the same time.

Increases in timing difference 814 between carriers can require that the UE buffer data for one of the carriers 802 or 804 for a time approximately equivalent to the timing difference 814, which can increase UE complexity. While timing difference 814 may be relatively small in certain urban areas, where cell radius is relatively small, a larger cell radius in rural areas may result in longer delay times. Additionally, different carriers may have different deployments of repeaters. As an example, carrier 802 may have been relayed through a repeater while carrier 804 may not have been relayed through a repeater. As a result, the timing difference 814 between the two carriers can be partly due to the different deployments of repeaters.

Figure 9:
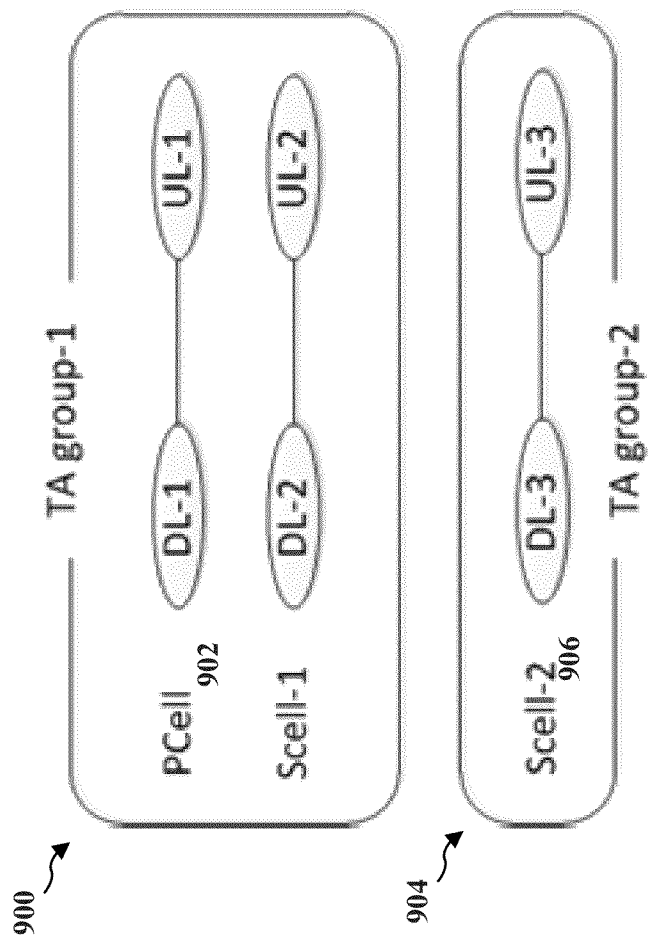
FIG. 9 is a block diagram illustrating TA Groups.

Multiple timing advance groups (TA Group) may be defined for a UE configured for carrier aggregation. A TA Group typically comprises one or more uplink carriers controlled by the same TA commands transmitted from an eNB. TA Groups may be configured by a serving eNB using dedicated signaling. FIG. 9 illustrates an example in which one TA Group 900 includes a primary cell 902 (the primary TA Group) while TA Group 904 includes only one or more secondary cell 906 (a secondary TA Group). In this example, timing of primary TA Group 900 is configurable using signaling supported by primary cell 902. A PDCCH order directed to an activated secondary cell 906 in TA Group 904 may initiate a random access procedure that may result in the use of a physical random access channel (PRACH) and power prioritization may be used to accommodate concurrent transmissions of a PUCCH and the PRACH. A PDCCH order may be used, for example, after UL and DL resources have been released and the eNB has DL data to send to the UE. PRACH is typically a robust channel and may be assigned lower priority than PUSCH, PUCCH and SRS for power prioritization purposes. PRACH prioritization may be based on factors such as whether contention or non-contention PRACH is used and whether PRACH is transmitted in a primary TA Group or in a secondary TA Group channel.

When multiple TA Groups are defined for a UE, timing differences may exist between uplink carriers transmitted by the UE because the one or more TA Groups may have received a TA command different from the TA commands received by the other TA Groups. TA commands may cause two or more TA Groups to have timing offsets that are different from one another and these timing differences may be characterized as a relative delay between a pair of TA Groups, or between corresponding component carriers, subframes, and/or symbols within the pair of TA Groups. FIG. 8B illustrates the timing 816 for downlink timing (826) and uplink timing (828). Downlink carriers 818 and 820 are received with a first timing offset 830 and uplink carriers 822, 824 are transmitted with a second timing offset 832. Uplink timing offset 832 may occur after different TA commands are received for each of uplink carriers 822 and 824 without complete knowledge of the state of the UE that transmits carriers 822 and 824. The uplink timing offset 832 may result in power prioritization conflicts where the misalignment in time of uplink carriers creates an overlap of a delayed symbol in one carrier with a next in sequence symbol in another carrier. A UE may resolve power prioritization based on the magnitude and characteristics of timing offset 832, and may determine whether certain signals, data or control information can be sent or should be withheld. The UE may compare timing offset 832 to a threshold value, such as half-symbol duration, and may suppress signals, data or control information if timing offset 832 exceeds the threshold. Timing offset 832 may exceed the threshold when, for example, a new TA command is received by the UE when a timing difference already exists between component carriers; in such instances, the UE may be configured to respond to the TA command by adjusting timing in accordance with the TA command, ignore the TA command or respond by making a partial adjustment to the timing. Timing differences between uplink carriers may be further due to the usage of different downlink carriers for uplink timing reference. As an example, UL CC1 822 may use the received downlink timing from DL CC1 818 as the reference, while UL CC2 824 may use the received downlink timing from DL CC2 820 as the reference.

Figure 10:
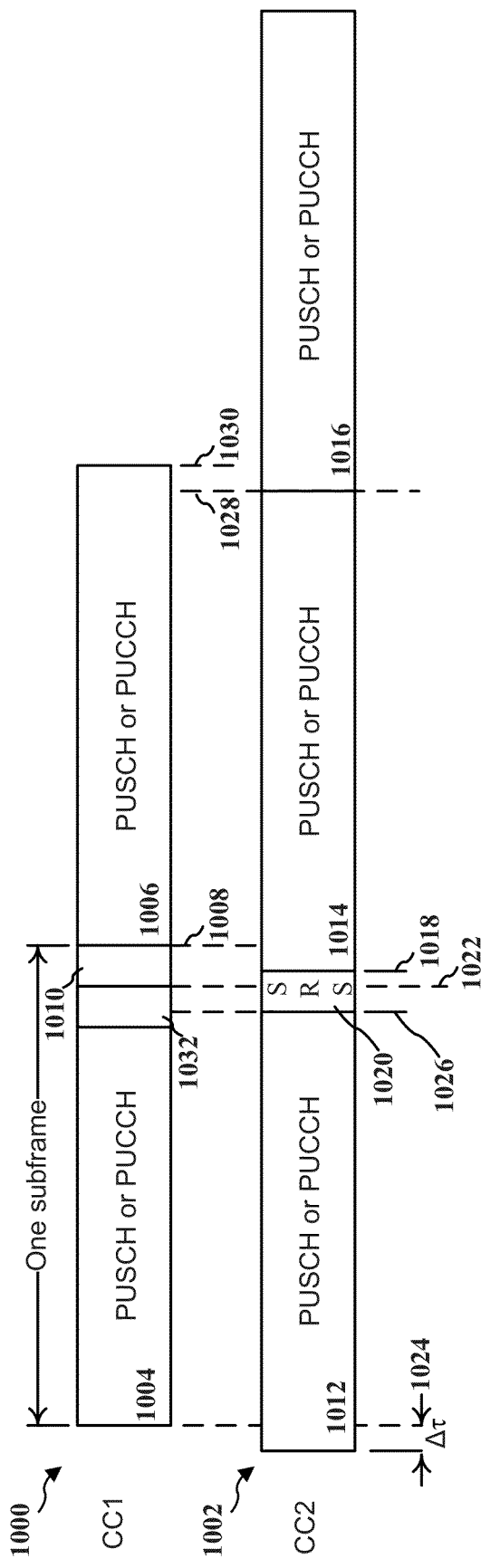
FIG. 10 illustrates the effect of timing differences between component carriers.

FIG. 10 illustrates the effect of timing differences between component carriers associated with a single UE. In the example depicted in FIG. 10, multiple TA Groups are defined for the UE and each TA Group has at least one component carrier. The UE may receive a configuration for a first TA Group that provides a first uplink timing for component carrier 1000 and may receive a configuration that provides a second uplink timing for component carrier 1002. The first and second uplink timings may be provided by one or more TA commands. The uplink timing configuration can result in a relative delay 1024 between component carriers 1000 and 1002. In the example, subframes 1004 and 1006 of component carrier 1000 are delayed with respect to subframes 1012, 1014, and 1016 of component carrier 1002. Relative delay 1024 may be quantified as the time elapsed between the start of subframe 1012 in component carrier 1002 and the start of corresponding subframe 1004 in component carrier 1000. Relative delay 1024 may be quantified as the time elapsed between the end 1018 of subframe 1012 in component carrier 1002 and the end 1022 of corresponding subframe 1004 in component carrier 1000. A sounding reference signal (SRS) may be transmitted in the final symbol 1020 of subframe 1012. The corresponding final symbol of subframe 1004 is unused to avoid interference with the SRS signal in symbol 1020. When relative delay 1024 has a non-zero value, an overlap of SRS in symbol 1020 may occur between the start 1026 of the final symbol 1020 of subframe 1012 and the end 1022 of the next-to-last symbol 1032 of subframe 1004 which may carry PUCCH and/or PUSCH in next-to-last symbol 1032 of subframe 1004. Consequently, a collision involving the SRS may occur for at least a portion of a symbol transmitted in subframe 1004. It is also possible that the uplink transmission timing of CC1 1000 leads the transmission timing of the uplink transmission timing of CC2 1002. In this case, it is possible that an overlap of SRS 1020 may occur between the end of the final symbol of subframe 1012 for at least the end of SRS 1026 and the start of the first symbol of subframe 1006 for PUCCH and/or PUSCH.

A UE may respond to the occurrence, or potential of occurrence, of an SRS collision by dropping the SRS, dropping a colliding symbol that includes data or control information or implementing a power prioritization scheme if the UE is configured for power limitation. The SRS may be dropped to avoid coexistence of SRS with PUCCH or PUSCH in the same symbol, within the same component carrier and/or in a different component carrier. In some embodiments, the UE can be configured to avoid collisions between SRS and PUSCH or PUCCH to avoid the need to prioritize power between SRS and either PUCCH or PUSCH. The UE may prioritize power by scaling power equally between SRS on different component carriers and by assigning PUCCH a higher priority than PUSCH. A PUSCH that includes uplink control information (UCI) maybe assigned the next highest priority, with other PUSCHs having equal power scaling.

The UE may be configured to apply different power scaling within a subframe where relative delay 1024 is present. For example, different power prioritizations may be used within subframe 1014 including prioritizations that apply: after the start 1018 of subframe 1014 but before the start 1008 of subframe 1006; after the start 1008 of subframe 1006 but before the end 1028 of subframe 1014; and after the end 1028 of subframe 1014 but before the end 1030 of subframe 1006.

Power scaling may be implemented according to one or more predefined schemes. For example, the UE may be configured to support power ramping or power variations within a subframe. Power ramping may be configured to accommodate the transmission of PUSCH and SRS in the same subframe, where the power levels of PUSCH and SRS are different. In one example, the power level used for PUSCH may be ramped down from a level set for PUSCH in a subframe when SRS is transmitted concurrently with the PUSCH and the power level used for PUSCH may be ramped up when SRS is not transmitted concurrently with the PUSCH. Power ramping may be avoided when PUSCH and SRS are not provided in the same subframe. In some embodiments, PUCCH may be assigned the highest priority and constant power may be maintained when power limitation is implemented. When two or more TA Groups are transmitted synchronously, without timing offsets, the UE may establish priorities for PUSCH, PUCCH, SRS, and other signals and channels in order that power ramping and other power management issues are avoided. When the transmission of two or more TA Groups is subject to a timing offset, power prioritization schemes may be required to accommodate different power allocations during the duration of the timing offset.

A UE may prioritize power between SRS and PUCCH/PUSCH when concurrent transmission of SRS and PUCCH/PUSCH occurs or may conditionally occur. Concurrent transmission of SRS and PUCCH/PUSCH can occur when SRS is transmitted in the last symbol of a first subframe and PUCCH or PUSCH is transmitted in the first symbol of a second subframe that is transmitted in the same time interval as the first timeframe. Concurrent transmission of SRS and PUCCH/PUSCH can also occur when SRS is transmitted in the last symbol of a first subframe and PUCCH or PUSCH is transmitted in the second-last symbol of a second subframe that lags in time the first timeframe by less than one symbol duration. The occurrence of concurrent transmission may be conditional if a condition exists that may give rise to concurrent transmission of SRS and PUCCH/PUSCH, such as the existence of a timing offset and/or the possibility that the UE may transmit PUCCH or PUSCH in the first, last, or next to last symbol of a subframe.

The UE may set different priorities for periodic SRS and non-periodic SRS. For example, aperiodic SRS may be assigned higher priority than the priority of CQI while periodic SRS may be assigned a lower priority than CQI. The UE may set a priority for SRS that is lower than the priority of one or more of PUCCH and PUSCH. The UE may set the SRS priority higher than PUSCH and lower than PUCCH (PUSCH can typically tolerate a certain amount of power ramping). In some embodiments, SRS priority may be higher than both PUCCH and PUSCH. In some embodiments, multiple SRS transmissions from different carriers may have the same priority. In some embodiments, SRS transmissions from the primary carrier may have a higher priority than the SRS transmissions from a secondary carrier. In some embodiments, SRS transmissions from the primary TA group may have a higher priority than the SRS transmissions from the secondary TA group.

The UE may prioritize power based on the power of two or more subframes (e.g., current and next subframes) when a transmit timing difference exists. The UE may consider the transmit power levels of the two adjacent subframes of each uplink carrier jointly to determine power saturation conditions and to perform prioritization and scaling. For example, for each carrier, the UE may determine the maximum transmit power of all the subframes involved in the power prioritization process, and perform power prioritization across carriers based on the maximum transmit power determined for each carrier. The involvement of multiple subframes and multiple carriers simultaneously in power prioritization can be a complicated procedure and may result in high implementation cost. In some embodiments, power prioritization may be implemented on a per-subframe basis. Power prioritization for fractions of subframes subject to collision may be based on the approach configured to manage collisions. Alternatively, power prioritization for fractions of subframes subject to collision can be left for implementation without any explicit handling specified. In this case, power prioritization across carriers may be performed on a per subframe basis. This may simplify power prioritization, resulting in lower implementation complexity.

In the presence of timing offsets between the uplink component carriers, the UE may be configured to handle timing difference based on whether the timing difference exceeds a predefined threshold value. For example, a maximum threshold value for relative propagation delay between component carriers may be set to 30 µs, which may correspond to approximately a half-symbol duration. This threshold may be used to determine whether to transmit SRS during a portion of the symbol duration or to refrain from transmitting the SRS. The threshold may be used to determine if a short duration concurrent transmission of SRS and PUCCH/PUSCH can be accommodated using an alternative power prioritization scheme for the short duration of concurrent transmission of the SRS and PUCCH/PUSCH. The UE may be configured to determine whether to transmit data or control information on uplink carrier 1000 concurrently with the SRS 1020 transmitted in subframe 1012 of uplink carrier 1002. Where other component carriers are present, the UE may determine whether power prioritization may be used to allow one or more SRS to be transmitted when data or control information is concurrently transmitted on any of the other component carriers. The magnitude of the delay may also determine whether a partial SRS can be transmitted when no collisions are occurring.

In certain embodiments, the UE may be configured to prevent concurrent transmission of SRS and PUSCH or PUCCH. Collisions of SRS with PUSCH and PUCCH can be avoided within a single TA Group, where uplink carriers are transmitted synchronously, by refraining from transmitting data or control information when an SRS is transmitted in a component carrier of the TA Group. When timing offsets exist between two or more TA Groups, the UE may determine that the SRS and data or control information is not to be transmitted concurrently. In the example shown in FIG. 10, the UE may refrain from transmitting data or control information in the last symbol 1010 and in the next-to-last symbol 1032 of subframe 1004, because of the overlap of in symbol 1020 with these symbols 1010 and 1032. The UE may refrain from transmitting the SRS when data or control information is to be transmitted in the next-to-last symbol 1032 or the last symbol 1010 of subframe 1004. The UE may also avoid collisions by transmitting a shortened SRS, or data or control information in one or more component carriers.

The decision to transmit or refrain from transmitting SRS, PUSCH, and PUCCH may be based on the magnitude of timing differences between TA Groups. The magnitude of a timing difference between a pair of TA Groups may be measured as an absolute timing difference between the TA Groups based on a common reference time. The magnitude of a timing difference between a pair of TA Groups may be measured by subtracting the timing offset corresponding to a first TA Group from the timing offset corresponding to the second TA Group, such that a positive value indicates that the second group lags the first group and a negative value indicates that the first group lags the second group. The sign of the timing difference may also be used to identify overlapping symbols and subframes.

A decision to transmit or refrain from transmitting SRS, PUCCH or PUSCH may be based, at least in part, the magnitude of the absolute timing offset between two TA Groups. For example, the decision may be based on whether the timing difference is greater than, equal to or less than one or more threshold values. A threshold value may be selected to represent a portion of a symbol duration of a single carrier frequency division multiple access (SC-FDMA) symbol, such as half a symbol.

The UE may refrain from transmitting SRS in a subframe when one or more one PUCCH or PUSCH is being transmitted in the last symbol of a subframe in the same TA Group. When no PUCCH or PUSCH is being transmitted in the last symbol of a subframe, one or more SRS may be transmitted in the TA Group. The UE may refrain from transmitting SRS in a first TA Group when one or more one PUCCH or PUSCH is being transmitted in the last symbol of a subframe in a different TA Group. Even when no PUCCH or PUSCH is transmitted in the last symbol of a subframe in any TA Group, the UE may refrain from transmitting SRS in any TA Group to avoid collisions arising from timing differences between the TA Groups. In some embodiments, the UE may refrain from transmitting SRS in any TA Group only if a collision is detected.

Figure 11C:
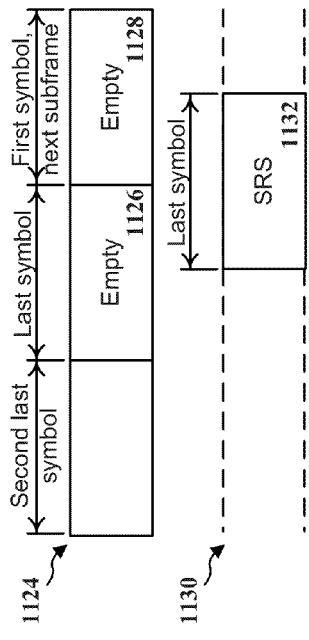
FIG. 11C illustrates another example of an SRS collision avoidance scheme.
Figure 11D:
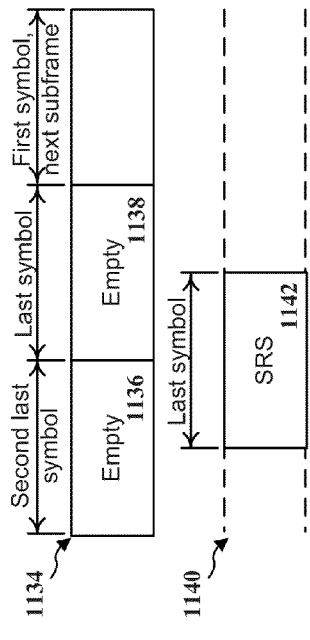
FIG. 11D illustrates another example of an SRS collision avoidance scheme.
Figure 11A:
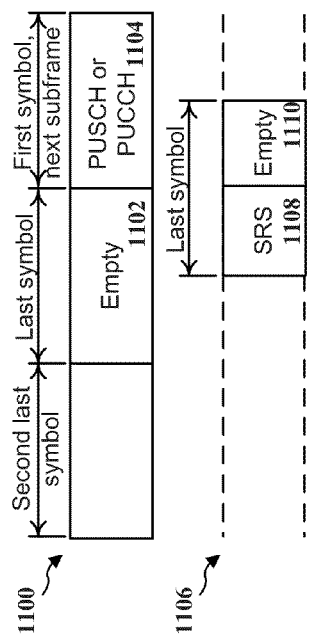
FIG. 11A illustrates an example of an SRS collision avoidance scheme.
Figure 11B:
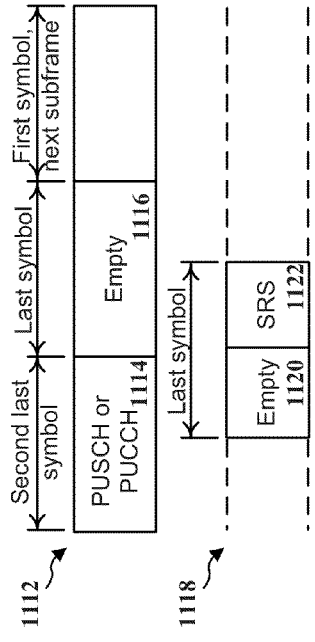
FIG. 11B illustrates another example of an SRS collision avoidance scheme.

With reference to FIGS. 11A and 11B, collisions may be avoided between SRS transmitted in a first TA Group and data or control information transmitted in a second TA Group by sending a partial SRS. The partial SRS may be of any desired or predefined duration or may be selected based on the timing difference between two TA Groups. As depicted in FIGS. 11A and 11B, the duration of the SRS 1108 can be set to a half-symbol duration. In FIG. 11A, a half-symbol SRS 1108 is transmitted in a component carrier 1106 that is delayed with respect to component carrier 1100 of a different TA Group. The last symbol of a subframe in component carrier 1106 overlaps both the last symbol 1102 of the corresponding subframe in component carrier 1100 and the first symbol 1104 of the next subframe of component carrier 1100. The UE may avoid SRS collision with the data or control information in symbol 1104 by transmitting the SRS in the first half 1108 of the last symbol of the subframe in component carrier 1106 and suppress the SRS in the second half 1110 of the last symbol of the subframe in component carrier 1106. In FIG. 11B, a half-symbol SRS 1122 is transmitted in a component carrier 1118 where component carrier 1112 of a different TA Group is offset with respect to component carrier 1118. The last symbol of a subframe in component carrier 1118 overlaps both the last symbol 1116 and the second-last symbol 1114 of the corresponding subframe in component carrier 1112. The UE may avoid collision with the data or control information in symbol 1114 by transmitting SRS in the second half 1122 of the last symbol of the subframe in component carrier 1118 and suppress the SRS in the first half 1120 of the last symbol of the subframe in component carrier 1100.

A half-symbol SRS may be transmitted when the UE detects a collision, when two TA Groups are defined, or when an offset is detected between two TA Groups that may lead to a collision. The UE may determine which symbol-half carries the half-symbol SRS based on the sign of the difference of an offset between two component carriers involved in a collision. The UE may communicate one or more of the existence of an offset, the sign of the difference of timing offsets between two component carriers involved in a collision and the transmission of half-symbol SRS to eNB. The eNB may maintain orthogonality of SRS transmissions across multiple UEs and may be configurable to support a combination of SRS formats, including full-symbol SRS, half-symbol SRS with SRS in first half-symbol (1108) and half-symbol SRS with SRS in second half-symbol 1122. The eNB may cause one of two available transmission combs to be disabled when half-symbol SRS is used. The eNB may configure the UE to use half-symbol SRS in all SRS transmission occasions. The eNB may also configure the UE to use half-symbol SRS in some SRS transmission occasions, and to use full-symbol SRS in some other SRS transmission occasions.

With reference to FIGS. 11C and 11D, collisions may be avoided between SRS transmitted in a first TA Group and data or control information transmitted in a second TA Group by refraining from transmitting data or control information in colliding symbols of the second TA Group. In FIG. 11C, the TA Group 1124 leads TA Group 1130 and a collision between SRS 1132 and the first symbol 1128 of the next subframe would occur if a PUCCH or PUSCH were transmitted in symbol 1128. The UE may refrain from transmitting data or control information in last symbol 1126 of the subframe corresponding to the subframe carrying SRS and the first symbol 1128 of the next subframe. In FIG. 11D, the TA Group 1140 leads TA Group 1134 and a collision between SRS 1142 in TA Group 1140 and the second last symbol 1136 of a corresponding subframe in TA Group 1134 would occur if a PUCCH or PUSCH were transmitted in symbol 1136. UE may refrain from transmitting data or control information in symbols 1136 and 1138 of the subframe of TA Group 1134 corresponding to the subframe of TA Group 1140 carrying SRS.

Figure 12:
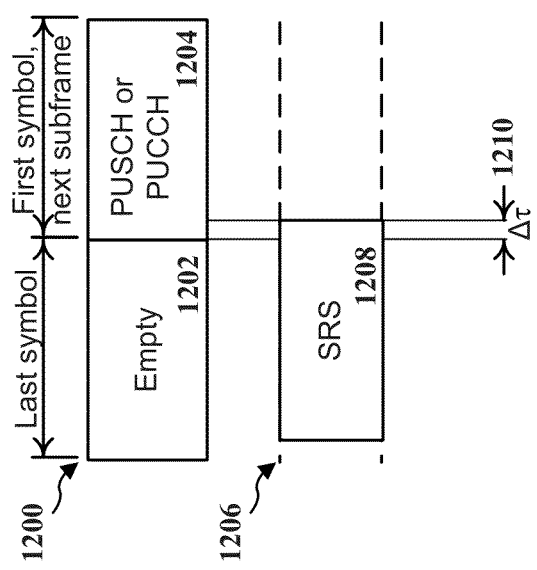
FIG. 12 illustrates short duration symbol overlap resulting in a short duration SRS collision.

Concurrent transmission of SRS and PUSCH or PUCCH may be accomplished under certain conditions. FIG. 12 depicts one example in which overlap of a symbol 1208 carrying SRS and a symbol 1204 carrying PUSCH or PUCCH occurs for a relatively short duration 1210. As depicted, the last symbol 1202 in a subframe of a first TA Group 1200 is empty but overlap occurs between a symbol 1208 carrying SRS in a subframe of a second TA Group 1206. The SRS may be transmitted when offset 1210 is less than a threshold value that is calculated based on cyclic prefix (CP) duration. In one example, SRS maybe transmitted if offset 1210 is less than the 5 µs duration of a normal CP or a 17 µs duration of an extended CP. Transmission of SRS during short overlap may be permitted if an actual collision is detected. Transmission of SRS during short overlap may be permitted if two or more TA Groups are defined for the UE.

Figure 13:
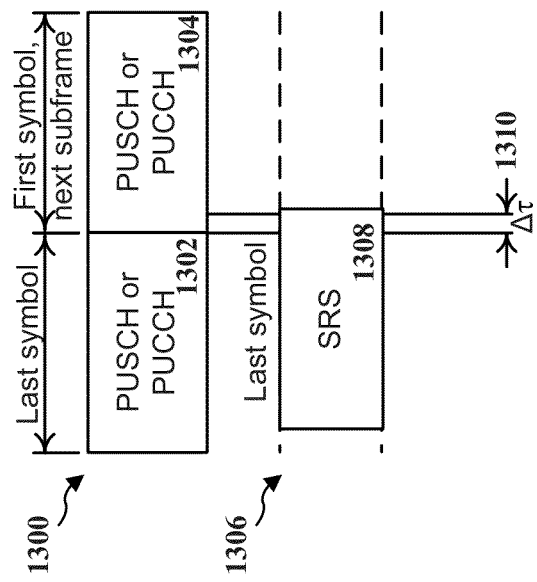
FIG. 13 illustrates concurrent transmission of SRS with data or control information.

In some embodiments, SRS may be transmitted concurrently with PUSCH or PUCCH. As depicted in FIG. 13, PUSCH or PUCCH may be transmitted in both the last symbol 1302 of a first subframe and the first symbol 1304 of the next subframe in TA Group 1300. SRS may be transmitted in the last symbol 1308 of a corresponding first subframe of TA Group 1306. In some embodiments, the UE refrains from transmitting PUSCH or PUCCH in the last symbol 1302 of a first subframe and but may transmit PUSCH or PUCCH in the first symbol 1304 of the next subframe in TA Group 1300. In this case, concurrent SRS and PUSCH/PUCCH transmission may be allowed when they collide during a fraction of symbol duration. In some embodiments, such concurrent transmission may be applied for inter-TA Groups whereby PUSCH and/or PUCCH in one TA Group may be transmitted concurrently with SRS in another TA Group. Typically, PUSCH and/or PUCCH in one TA Group may not be transmitted concurrently and SRS in the same TA Group. In some embodiments, concurrent transmission can occur if PUSCH/PUCCH and SRS can occur in both intra-TA Group and inter-TA Groups whereby concurrent transmission of PUSCH and/or PUCCH and SRS is allowed both in the same TA Group and in different TA Groups. Concurrent transmission may require power prioritization between SRS and PUSCH and/or PUCCH. In certain embodiments, concurrent transmission is permitted if the SRS and PUCCH/PUSCH are transmitted in different TA Groups.

The decision to transmit or refrain from transmitting SRS, PUSCH, and PUCCH may depend on whether the UE is power limited or not power limited. When the UE is not power limited, concurrent SRS and PUCCH and/or PUSCH transmissions may be allowed. However, when the UE is power limited, SRS may be dropped in order to avoid concurrent SRS and PUCCH and/or PUSCH transmissions. This can simplify design and implementation efforts. The concurrent transmission can further be constrained such that the collision involves partially overlapped symbols. For example, when the last symbol of a subframe is not used PUCCH or PUSCH, SRS of the same last symbol in the subframe can be transmitted even if it partially overlaps with the PUCCH and/or PUSCH transmission. However, when the last symbol of a subframe is used by PUCCH or PUSCH, SRS of the last symbol in the corresponding subframe can be dropped. The concurrent transmission can be further constrained such that the collision is limited to different TA Groups. For example, if SRS in one TA Group may collide with PUCCH and/or PUSCH in a different TA Group, concurrent transmission may be allowed. If SRS collides with PUCCH and/or PUSCH in the same TA Group, SRS may be dropped.

If a timing offset 1310 exists between TA Group 1300 and TA Group 1306, power prioritization may be required between SRS transmitted in last symbol 1308 of a subframe in TA Group 1306 and both the PUSCH or PUCCH transmitted in the last symbol 1302 of the corresponding subframe in TA Group 1300 and PUSCH or PUCCH transmitted the first symbol 1304 of the next subframe in TA Group 1300.

A UE may signal timing information related to TA Groups. Timing information may be signaled on a periodic basis. Signaling of timing information may be event driven and the UE may signal timing information upon or after the occurrence of one or more conditions. Timing information signaled by the UE may include current timing state for some or all of the TA Groups defined for the UE. Timing information may include an indication of a TA Group that leads or lags another TA Group and an actual timing difference between TA Groups. The timing information signaled by the UE may indicate whether a primary TA Group leads or lags one or more secondary TA Groups. The actual timing difference may be an actual observed timing difference, which may be quantized. In the example of a normal cyclic prefix, two bits may be used to signal that the timing difference is more than +5 μs, between 0 and +5 μs, between 0 and −5 μs or larger than −5 μs, whereby the sign indicates which TA Group leads or lags the other TA Group. More bits can be used to obtain more resolution; for example, an 8 bit signal can provide 2 μs resolution coded to represent a set of time values such as {<−30, −30, −28, . . . , −2, 0, 2, 4 . . . , 30, 30+}μs.

Timing information may be signaled in a MAC payload or physical layer channel. Typically, uplink timing information is not expected to change dynamically. The use of MAC payload to signal timing information permits the UE to convey detailed timing information. A SR transmission in the physical layer channel can be reassigned or otherwise used to signal timing information. For example, one of 10 SR transmission instances transmitted in PUCCH format 3 can be re-defined to carry the uplink transmission timing information in the form of a single bit that indicates whether a TA Group comprising one or more secondary component carriers leads or lags with respect to a TA Group that includes a primary component carrier.

A maximum transmit timing difference threshold may be defined for a UE. The UE may be configured to enforce the maximum threshold for transmit timing difference between TA Groups, and the UE may signal whether or not the threshold has been exceeded. The threshold may be exceeded when multiple TA commands are received by the UE, where the cumulative effect of the TA commands results in the timing difference exceeding the maximum threshold timing difference for TA Groups. For example, receipt of a TA command to advance timing of a primary TA Group by 15 μs when the primary TA Group already leads a secondary TA Group by 20 μs would cause the timing difference to exceed a 30 μs maximum threshold difference where the UE follows the TA command faithfully.

The UE may be configured to enforce a limit on timing difference between TA Groups and the UE may ignore or partially implement "threshold-saturated" TA commands. When the UE receives a TA command received for the primary TA Group (TA_P command), the UE may set the uplink transmit timing for the primary TA Group based on the TA_P command and adjust the uplink transmit timing for one or more secondary TA Group such that the uplink transmit timing difference does not exceed the threshold maximum value. For example, when a 15 μs TA_P would result in a 35 μs uplink transmit timing difference, the timing of the primary TA Group may be advanced 15 μs and the timing of a secondary TA group may be adjusted by −5 μs to maintain the timing difference within a 30 μs maximum difference.

When the UE receives a TA command received for the secondary TA Group (TA_S command), the UE may set the uplink transmit timing for the secondary TA Group based on the TA_S command and adjust the uplink transmit timing for the primary TA Group such that the uplink transmit timing difference does not exceed the threshold maximum value. In some embodiments, a TA_S command that would cause the uplink transmit timing difference to exceed the threshold maximum difference may be partially implemented: for example, the UE may advance secondary TA Group timing by 10 μs when a TA_S command that advances the secondary TA Group timing by 15 μs would cause the uplink transmit timing difference to exceed the threshold maximum difference by 5 μs.

When the UE receives TA_P and TA_S commands that, together would cause the uplink transmit timing difference to exceed the threshold maximum difference, the UE may set the uplink transmit timing for the primary TA Group based on the TA_P command and adjust the uplink transmit timing for the secondary TA Group such that the uplink transmit timing difference does not exceed the threshold maximum value. When the UE receives TA_P and TA_S commands that, together would cause the uplink transmit timing difference to exceed the threshold maximum difference, the UE may apply any combination of the uplink transmit timing for the primary and secondary TA Groups that ensures that the uplink transmit timing difference does not exceed the threshold maximum value.

The UE may also handle any automatic transmit timing adjustment as it would handle a TA command. The UE may adjust uplink transmit timing (typically in increments of 2 μs) under certain conditions including, for example, when different downlink reference timing is received. As with TA commands, the UE may selectively adjust one of the TA Group uplink transmit timings by a desired increment while adjusting the timing of a different TA Group to ensure that the uplink transmit timing difference does not exceed the threshold maximum value. The UE may also adjust the uplink transmit timing of both TA Groups to ensure that the uplink transmit timing difference does not exceed the threshold maximum value.

The UE may be configured or indicated that the uplink transmit timing difference is only allowed to be positive or negative. For example, if a UE is configured with a primary TA group and a secondary TA group, the UE can be configured or indicated that the primary TA group shall always lead the secondary TA Group in the uplink transmission timing. Alternatively, the UE can be configured or indicated that the primary TA group shall always lag the secondary TA Group. This one-sided uplink transmit timing difference would simplify power prioritization and uplink transmissions. As an example, if there is a repeater deployed in the primary TA group in the uplink, but no repeater deployed in the secondary TA group in the uplink, the UE can typically expect that the primary TA group would have more delay than the secondary TA group. As a result, the UE can be informed that the primary TA group shall always lead the secondary TA group in order to compensate the additional delay introduced by the repeater.

As shown in FIGS. 14A and 14B, a UE may provide an uplink pilot timeslot (UpPTS) for time division duplex (TDD). The UpPTS may be carried in the last symbol 1404 and 1418 and in the second last symbol 1402 and 1416 of an uplink carrier. The UE may apply special rules for UpPTS conflicts because UpPTS typically does not carry PUCCH or PUSCH. In FIG. 14A, TA Group 1400 leads TA Group 1408 and the last symbol 1412 in a subframe of TA Group 1408 overlaps a portion of the first symbol 1406 of the next subframe in TA Group 1400. The UE may avoid conflicts between SRS and PUCCH or PUSCH by transmitting SRS in next to last symbol 1410.

In FIG. 14B, TA Group 1422 leads TA Group 1414 and there is not conflict between last symbol 1426 and the first symbol 1420 of the next subframe in TA Group 1414. The UE may transmit SRS in the last symbol 1426. In some embodiments, the UE may transmit SRS in both of the last two symbols 1424 and 1426 of a subframe in TA group 1422, provided downlink interference to SRS transmissions can be tolerated.

The transmission of SRS concurrently with UpPTS as illustrated in FIG. 14A may be employed in TDD carrier aggregation that uses either the same or different uplink and downlink configurations. The transmission of SRS concurrently with UpPTS may be employed in TDD carrier aggregation when different switching periodicities are used.

Figure 15:
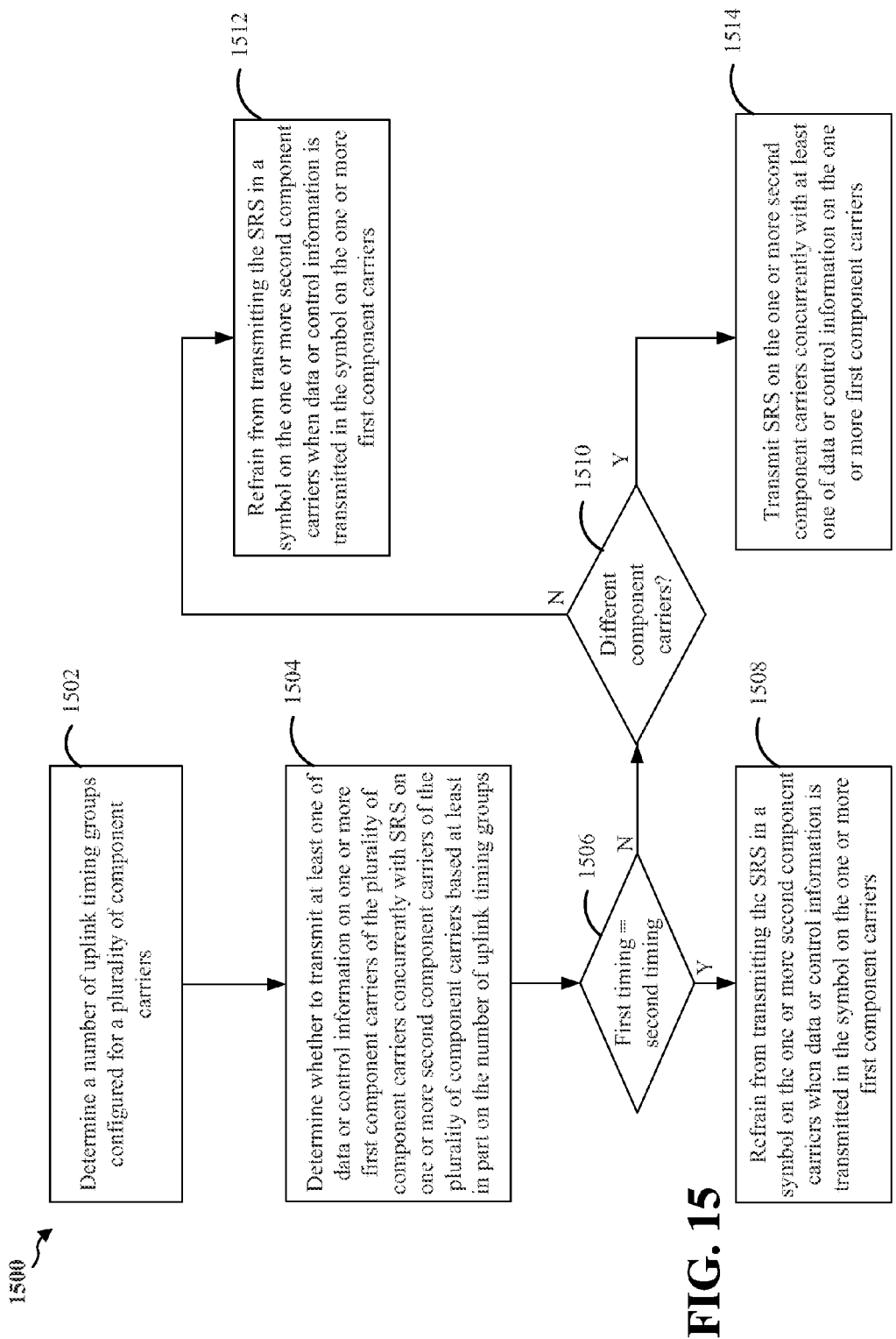
FIG. 15 is a flow chart of a method of wireless communication.

FIG. 15 is a flow chart 1500 of a method of wireless communication. The method may be performed by an UE. At step 1502, the UE determines a number of uplink timing groups configured for a plurality of component carriers.

At step 1504, the UE determines whether to transmit at least one of data or control information on one or more first component carriers of the plurality of component carriers concurrently with sounding reference signals (SRS) on one or more second component carriers of the plurality of component carriers based at least in part on the number of uplink timing groups.

If at step 1506, the UE determines only one uplink timing group (timing of first and second component carriers is the same), then at step 1508, the UE may refrain from transmitting the SRS in a symbol on the one or more second component carriers when data or control information is transmitted in the symbol on the one or more first component carriers.

If at step 1506, the UE determines at least two uplink timing groups, then the UE may determine at step 1510 whether the one or more first component carriers and the one or more second component carriers comprise different component carriers. In one example, the one or more first component carriers and the one or more second component carriers may be associated with a same uplink timing group. In another example, the one or more first component carriers and the one or more second component carriers may be associated with different uplink timing groups.

If the one or more first component carriers and the one or more second component carriers comprise different component carriers, then at step 1514 the UE may transmit SRS on the one or more second component carriers concurrently with at least one of data or control information on the one or more first component carriers. If the one or more first component carriers and the one or more second component carriers comprise at least one common component carrier, then at step 1512 the UE may refrain from transmitting SRS on the one or more second component carriers when data or control information is transmitted in the symbol on the one or more first component carriers.

In certain embodiments, the UE determines whether to transmit the at least one of the data or the control information on the one or more first component carriers concurrently with the SRS on the one or more second component carriers based on whether a UE is power limited from transmitting the at least one of the data or the control information concurrently with the SRS. The SRS and the at least one of the data or the control information may be transmitted concurrently when the UE is not power limited and the UE may refrain from transmitting the SRS and the at least one of the data or the control information concurrently when the UE is power limited.

In some embodiments, the number of uplink timing groups is determined based on a higher layer signaling configuration. The UE may transmit information to an eNB indicating a difference between uplink timing associated with the one or more first component carriers and uplink timing associated with the one or more second component carriers.

Figure 16:
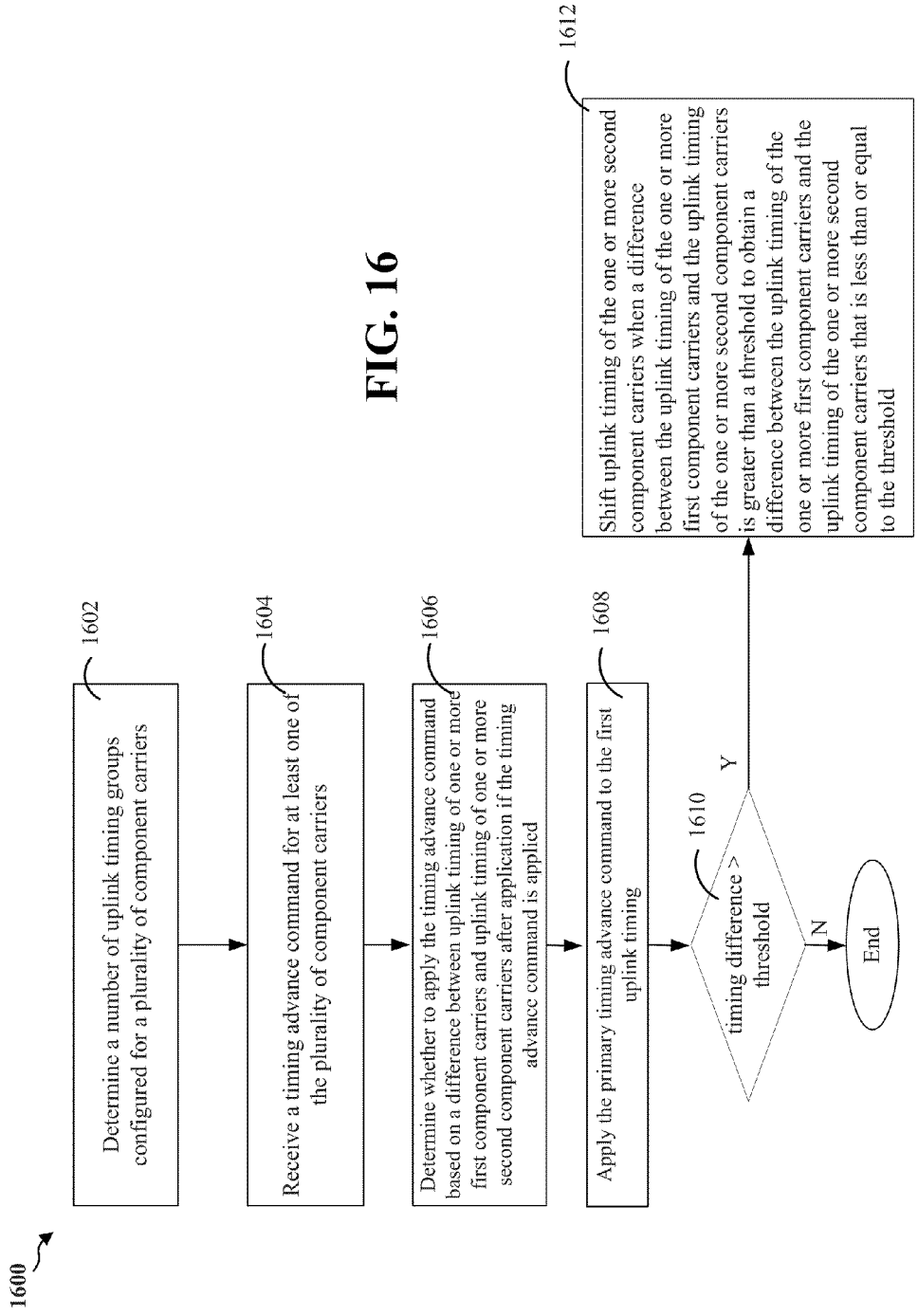
FIG. 16 is a flow chart of a method of wireless communication.

FIG. 16 is a flow chart 1600 of a method of wireless communication. The method may be performed by an UE. At step 1602, the UE determines a number of uplink timing groups configured for a plurality of component carriers.

At step 1604, the UE may receive a timing advance command for at least one of the plurality of component carriers. The timing advance command may be directed to the first component carriers.

At step 1606, the UE may determine whether to apply the timing advance command based on a difference between uplink timing of the one or more first component carriers and uplink timing of the one or more second component carriers after application if the timing advance command is applied.

At step 1608, the UE may apply the timing advance command to uplink timing of the one or more first component carriers.

At step 1610, the UE may determine if the timing difference between the uplink timing of the one or more first component carriers and the uplink timing of the one or more second component carriers is greater than a threshold. If the timing difference exceeds the threshold, then at step 1612, the UE may shift uplink timing of the one or more second component carriers. In one example, the uplink timing of the one or more second component carriers may shifted to obtain a difference between the uplink timing of the one or more first component carriers and the uplink timing of the one or more second component carriers that is less than or equal to the threshold.

Figure 17:
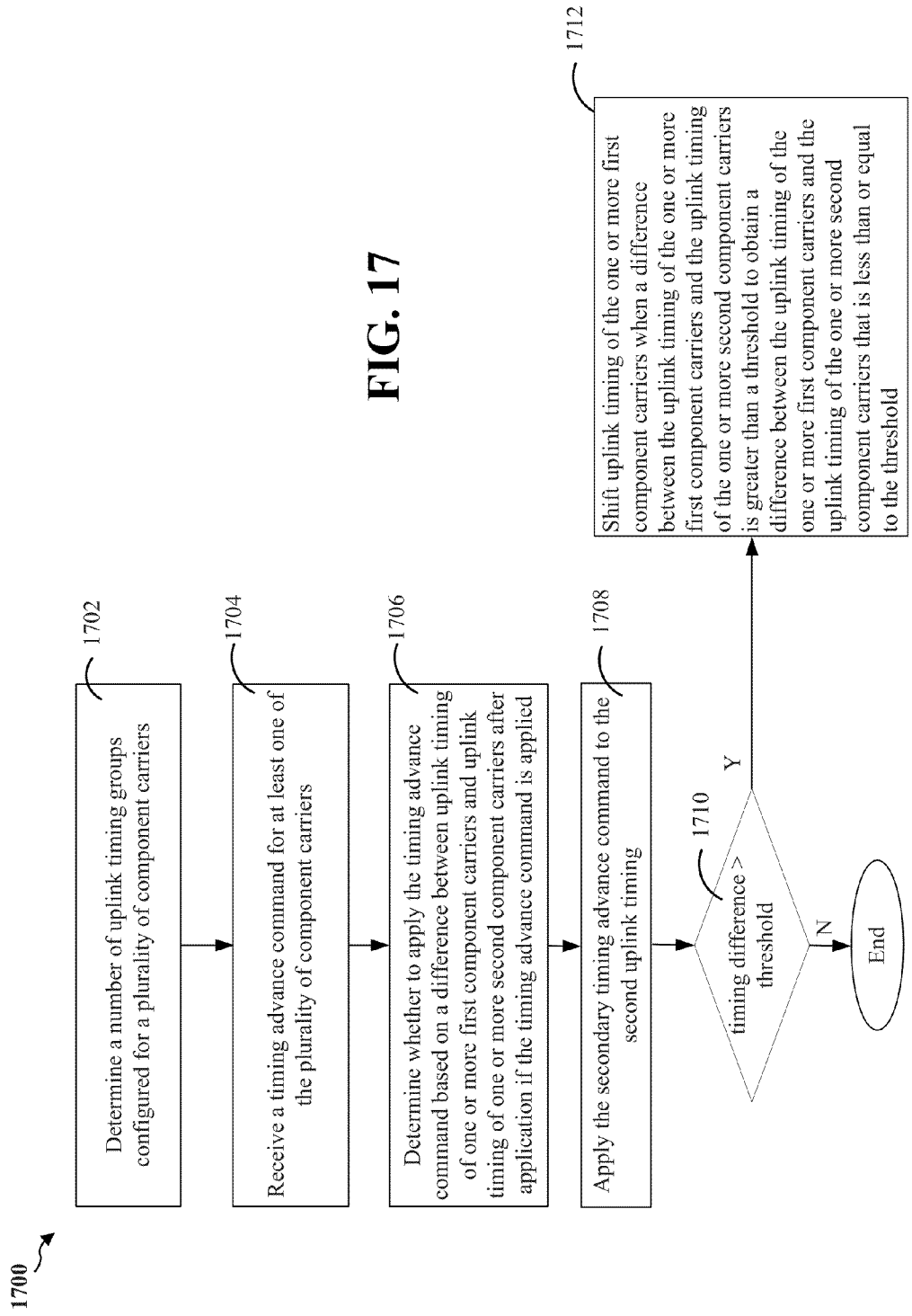
FIG. 17 is a flow chart of a method of wireless communication.

FIG. 17 is a flow chart 1700 of a method of wireless communication. The method may be performed by an UE. At step 1702, the UE determines a number of uplink timing groups configured for a plurality of component carriers.

At step 1704, the UE may receive a timing advance command for at least one of the plurality of component carriers. The timing advance command may be directed to the one or more first component carriers.

At step 1706, the UE may determine whether to apply the timing advance command based on a difference between uplink timing of the one or more first component carriers and uplink timing of the one or more second component carriers after application if the timing advance command is applied.

At step 1708, the UE may apply the timing advance command to uplink timing of the one or more first component carriers.

At step 1710, the UE may determine if the timing difference between the uplink timing of the one or more first component carriers and the uplink timing of the one or more second component carriers is greater than a threshold. If the timing difference exceeds the threshold, then at step 1712, the UE may shift uplink timing of the one or more first component carriers. In one example, the uplink timing of the one or more first component carriers may shifted to obtain a difference between the uplink timing of the one or more first component carriers and the uplink timing of the one or more second component carriers that is less than or equal to the threshold.

In certain embodiments, timing advance commands are received for both the first component carriers and for the second component carriers. The timing advance commands may be applied to the uplink timing of the respective component carriers and the UE may adjust the relative uplink timing of the first and second component carriers when the difference between the uplink timing of the first component carriers and the uplink timing of the second component carriers is greater than a threshold. For example, the UE may shift the uplink timing of at least one of the first component carriers or the second component carriers to obtain a difference between the uplink timing of the first component carriers and the second component carriers that is less or equal to the threshold. In some embodiments, only the uplink timing of the second component carriers is shifted when the difference between the uplink timing of the first component carriers and the second component carriers is greater than the threshold.

Figure 18:
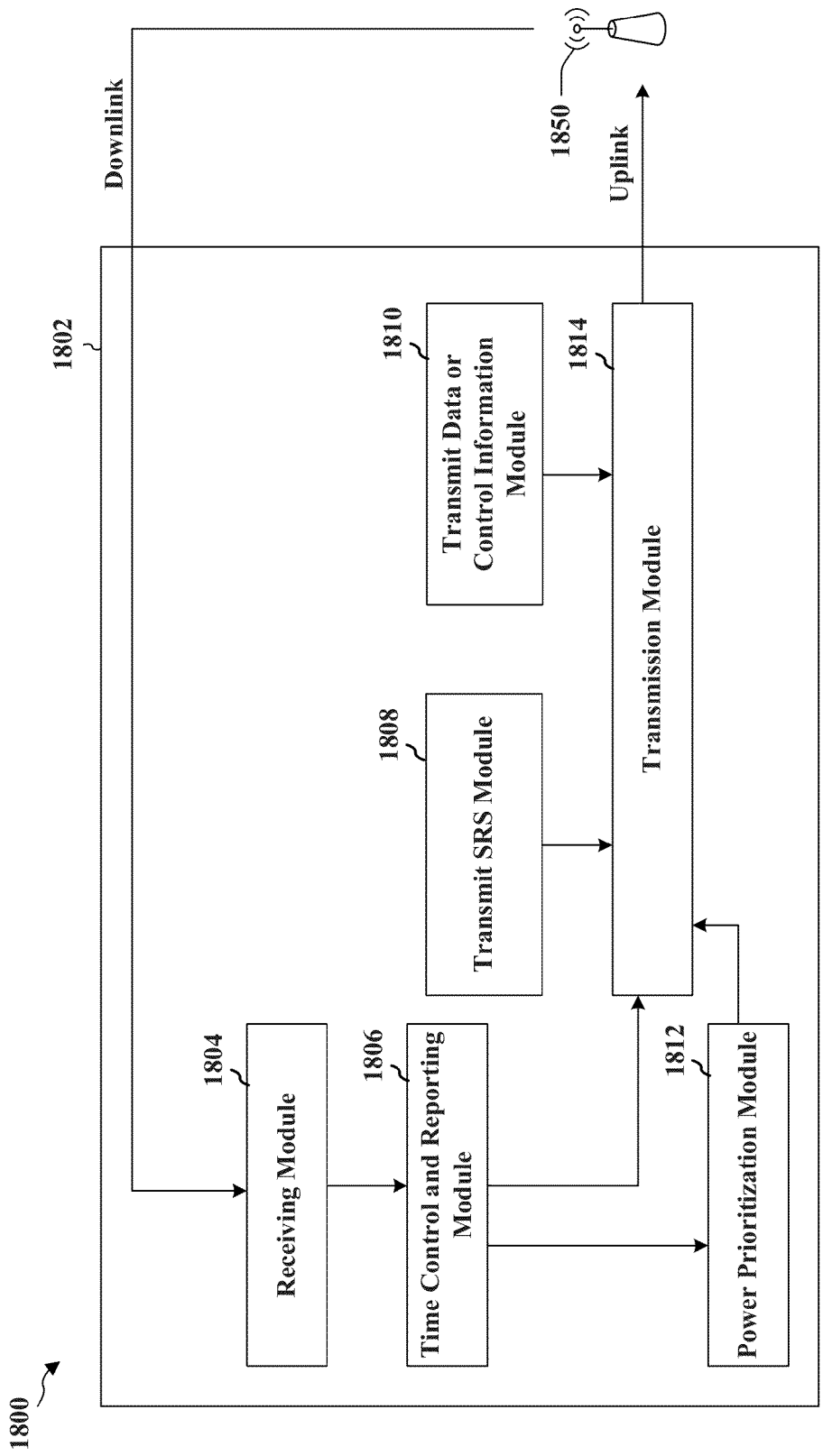
FIG. 18 is a conceptual data flow diagram illustrating the data flow between different modules/means/components in an exemplary apparatus.

FIG. 18 is a conceptual flow diagram 1800 illustrating an exemplary apparatus 1822 comprising a combination of modules/means/components. The apparatus 1822 may be a UE. The apparatus 1822 includes a module 1802 that receives downlink subframes, a module 1804 that determines time differences between uplink TA Groups, a module 1806 that selectively causes SRS to be transmitted in a portion of a symbol, module 1808 that causes SRS to be transmitted or suppressed, module 1812 that causes data and control information to be transmitted or suppressed, module 1814 that adjusts uplink transmission timing for one or more TA Groups and reports timing information to an eNB, module 1816 that prioritizes transmission power and module 1818 that controls transmission of uplink subframes.

The apparatus may include additional modules that perform each of the steps of the algorithm in the aforementioned flow charts FIGS. 15-17. As such, each step in the aforementioned flow charts FIGS. 15-17 may be performed by a module and the apparatus 1822 may include one or more of those modules. The modules may be one or more hardware components specifically configured to carry out the stated processes/algorithm, implemented by a processor configured to perform the stated processes/algorithm, stored within a computer-readable medium 1830 for implementation by a processor, or some combination thereof.

Figure 19:
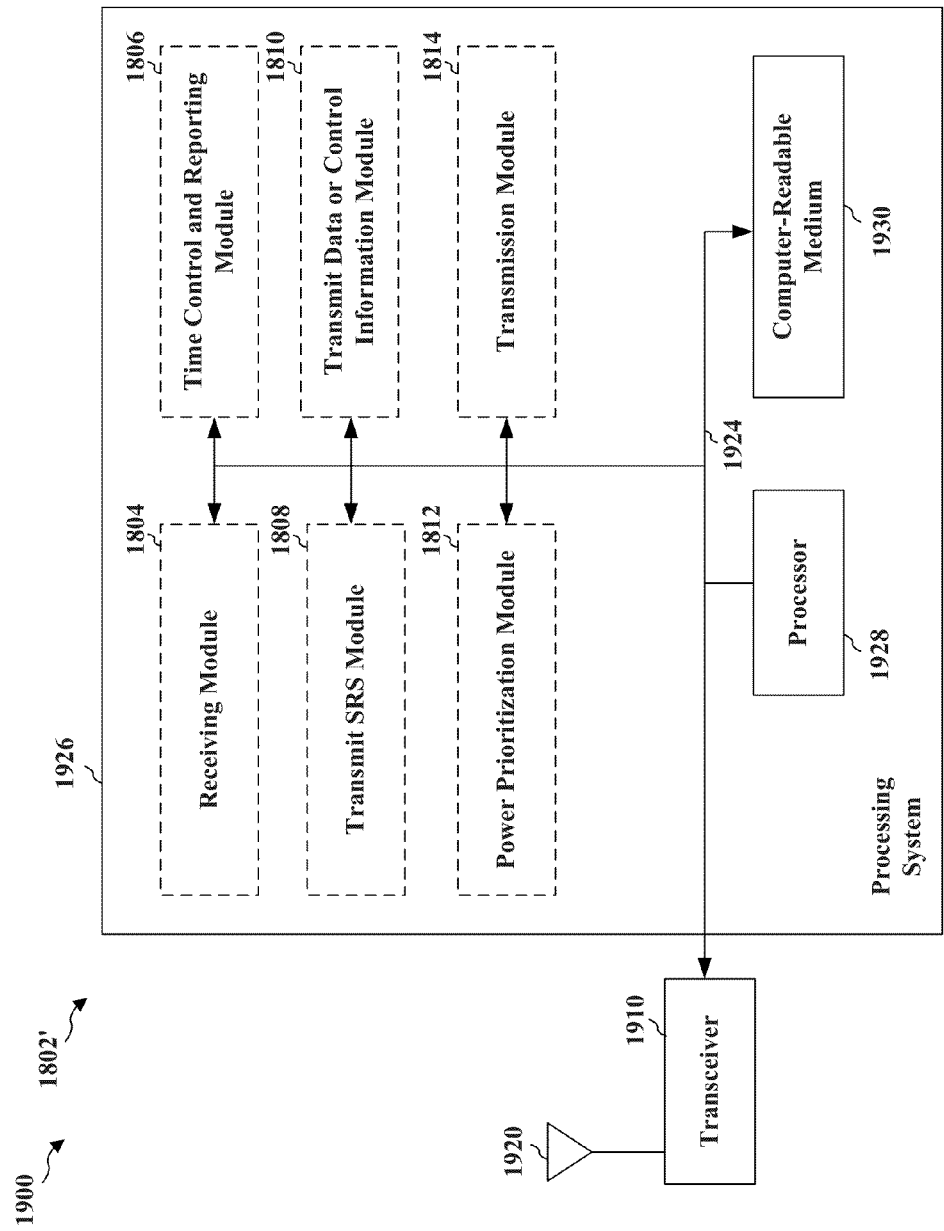
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1804, 1806, 1808, 1810, 1812, 1814, and the computer-readable medium 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The processing system 1914 includes a processor 1904 coupled to a computer-readable medium 1906. The processor 1904 is responsible for general processing, including the execution of software stored on the computer-readable medium 1906. The software, when executed by the processor 1904, causes the processing system 1914 to perform the various functions described supra for any particular apparatus. The computer-readable medium 1906 may also be used for storing data that is manipulated by the processor 1904 when executing software. The processing system further includes at least one of the modules 1804, 1806, 1808, 1810, 1812, and 1814. The modules may be software modules running in the processor 1904, resident/stored in the computer readable medium 1906, one or more hardware modules coupled to the processor 1904, or some combination thereof. The processing system 1914 may be a component of the UE 650 and may include the memory 660 and/or at least one of the TX processor 668, the RX processor 656, and the controller/processor 659.

In one configuration, the apparatus 1802/1802' for wireless communication includes means 1804 for receiving messages including timing advance commands, means 1806 for determining a number of uplink timing groups, means 1806, 1812 for determining whether to transmit data or control information on a component carrier concurrently with SRS another component carrier, means 1808 for providing SRS for transmission, means 1810 for providing the data or control information for transmission, means 1812 for determining and enforcing power control, and means 1814 for transmitting the SRS and/or the data or control information.

The aforementioned means may be one or more of the aforementioned modules of the apparatus 1802 and/or the processing system 1914 of the apparatus 1802' configured to perform the functions recited by the aforementioned means. As described supra, the processing system 1914 may include TX Processor 668, MIMO Processor 666, MIMO Detector 656, RX Processor 658, and controller/processor 659. As such, in one configuration, the aforementioned means may be the TX Processor 668, the RX Processor 656, and the controller/processor 659 configured to perform the functions recited by the aforementioned means. The means 1804 for receiving messages may include at least one antenna or antenna array 652a, in addition to MIMO Detector 656, RX Processor 658, controller/processor 659 and memory 682. The means 1814 for transmitting may comprise at least one antenna or antenna array 652r, in addition to TX Processor 668, MIMO Processor 666, and controller/processor 659 and memory 682. Means 1806, 1812, and 1808 may comprise controller/processor 659 and memory 682, which may be configured to control the operation of TX Processor 668, MIMO Processor 666, and modulator/demodulator 654r to process data received from data source 662 based on control and configuration information received from a network.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication of a user equipment (UE), comprising:
   determining a number of uplink timing groups configured for a plurality of component carriers;
   determining whether to transmit at least one of data or control information in a first symbol on one or more first component carriers of the plurality of component carriers concurrently with sounding reference signals (SRS) in a second symbol on one or more second component carriers of the plurality of component carriers based at least in part on the number of uplink timing groups, the second symbol overlapping with the first symbol;
   transmitting the at least one of the data or the control information in the first symbol; and
   refraining from transmitting the SRS in the second symbol when the number of uplink timing groups is determined to be greater than or equal to two and the UE is power limited in an overlapping portion of the first and second symbols.

2. The method of claim 1, wherein the number of uplink timing groups is determined based on a higher layer signaling configuration.

3. The method of claim 1, wherein only one uplink timing group is determined, and wherein the method further comprises:
   transmitting the SRS in a symbol on the one or more second component carriers when the at least one of the data or the control information is not transmitted in the symbol on the one or more first component carriers; and
   refraining from transmitting the SRS in the symbol on the one or more second component carriers when the at least one of the data or the control information is transmitted in the symbol on the one or more first component carriers.

4. The method of claim 1, wherein at least two uplink timing groups are determined and further comprising transmitting SRS on the one or more second component carriers concurrently with at least one of data or control information on the one or more first component carriers, when the one or more first component carriers and the one or more second component carriers comprise different component carriers.

5. The method of claim 4, wherein the one or more first component carriers and the one or more second component carriers are associated with a same uplink timing group.

6. The method of claim 4, wherein the one or more first component carriers and the one or more second component carriers are associated with different uplink timing groups.

7. The method of claim 4, wherein the determining whether to transmit the at least one of the data or the control information on the one or more first component carriers concurrently with the SRS on the one or more second component carriers is further based on whether a user equipment (UE) is power limited from transmitting the at least one of the data or the control information concurrently with the SRS.

8. The method of claim 7, further comprising:
   transmitting the SRS and the at least one of the data or the control information concurrently when the UE is not power limited; and
   refraining from transmitting the SRS and the at least one of the data or the control information concurrently when the UE is power limited.

9. The method of claim 1, comprising transmitting the SRS in the second symbol, concurrently with the at least one of the data or the control information in the first symbol, when the number of uplink timing groups is determined to be greater than or equal to two and the UE is not power limited in an overlapping portion of the first and second symbols.

10. A method of wireless communication, comprising:
    determining a number of uplink timing groups configured for a plurality of component carriers;
    determining whether to transmit at least one of data or control information on one or more first component carriers of the plurality of component carriers concurrently with sounding reference signals (SRS) on one or more second component carriers of the plurality of component carriers based at least in part on the number of uplink timing groups; and
    transmitting information to an evolved Node B (eNB) indicating a difference between uplink timing associated with the one or more first component carriers and uplink timing associated with the one or more second component carriers.

11. A method of wireless communication, comprising:
    determining a number of uplink timing groups configured for a plurality of component carriers;
    determining whether to transmit at least one of data or control information on one or more first component carriers of the plurality of component carriers concurrently with sounding reference signals (SRS) on one or more second component carriers of the plurality of component carriers based at least in part on the number of uplink timing groups;
    receiving a timing advance command for at least one of the plurality of component carriers; and
    determining whether to apply the timing advance command based on a difference between uplink timing of the one or more first component carriers and uplink timing of the one or more second component carriers if the timing advance command is applied.

12. The method of claim 11, wherein the timing advance command is for the one or more first component carriers, and further comprising:
    applying the timing advance command to uplink timing of the one or more first component carriers; and
    shifting uplink timing of the one or more second component carriers when a difference between the uplink timing of the one or more first component carriers and the uplink timing of the one or more second component carriers is greater than a threshold,
    wherein the uplink timing of the one or more second component carriers is shifted to obtain a difference between the uplink timing of the one or more first component carriers and the uplink timing of the one or more second component carriers that is less than or equal to the threshold.

13. The method of claim 11, wherein the timing advance command received is for the one or more first component carriers, and further comprising:

applying the timing advance command to the uplink timing of the one or more first component carriers; and shifting the uplink timing of the one or more first component carriers when the difference between the uplink timing of the one or more first component carriers and the uplink timing of the one or more second component carriers is greater than a threshold, wherein the uplink timing of the one or more first component carriers is shifted to obtain a difference between the uplink timing of the one or more first component carriers and the uplink timing of the one or more second component carriers that is less or equal to the threshold.

14. The method of claim 11, wherein timing advance commands for both the one or more first component carriers and for the one or more second component carriers are received, and further comprising:

applying the timing advance command for the one or more first component carriers to the uplink timing of the one or more first component carriers;

applying the timing advance command for the one or more second component carriers to the uplink timing of the one or more second component carriers; and shifting at least one of the uplink timing of the one or more first component carriers and the uplink timing of the one or more second component carriers, when the difference between the uplink timing of the one or more first component carriers and the uplink timing of the one or more second component carriers is greater than a threshold, wherein the at least one of the uplink timing of the one or more first component carriers and the uplink timing of the one or more second component carriers is shifted to obtain a difference between the uplink timing of the one or more first component carriers and the uplink timing of the one or more second component carriers that is less or equal to the threshold.

15. The method of claim 14, wherein only the uplink timing of the one or more second component carriers is shifted when the difference between the uplink timing of the one or more first component carriers and the uplink timing of the one or more second component carriers is greater than the threshold.

16. An apparatus for wireless communication of a user equipment (UE), comprising:

means for determining a number of uplink timing groups configured for a plurality of component carriers;

means for determining whether to transmit at least one of data or control information in a first symbol on one or more first component carriers of the plurality of component carriers concurrently with sounding reference signals (SRS) in a second symbol on one or more second component carriers of the plurality of component carriers based at least in part on the number of uplink timing groups, the second symbol overlapping with the first symbol;

means for transmitting the at least one of the data or the control information in the first symbol; and means for refraining from transmitting the SRS in the second symbol when the number of uplink timing groups is determined to be greater than or equal to two and the UE is power limited in an overlapping portion of the first and second symbols.

17. The apparatus of claim 16, wherein the number of uplink timing groups is determined based on a higher layer signaling configuration.

18. The apparatus of claim 16, wherein only one uplink timing group is determined, and wherein the apparatus further comprises means for transmitting the SRS in a symbol on the one or more second component carriers when the at least one of the data or the control information is not transmitted in the symbol on the one or more first component carriers, wherein the means for transmitting the SRS is configured to refrain from transmitting the SRS in the symbol on the one or more second component carriers when the at least one of the data or the control information is transmitted in the symbol on the one or more first component carriers.

19. The apparatus of claim 16, wherein at least two uplink timing groups are determined and further comprising means for transmitting the SRS on the one or more second component carriers concurrently with at least one of data or control information on the one or more first component carriers, when the one or more first component carriers and the one or more second component carriers comprise different component carriers.

20. The apparatus of claim 19, wherein the one or more first component carriers and the one or more second component carriers are associated with a same uplink timing group.

21. The apparatus of claim 19, wherein the one or more first component carriers and the one or more second component carriers are associated with different uplink timing groups.

22. The apparatus of claim 19, wherein the means for determining whether to transmit the at least one of the data or the control information on the one or more first component carriers concurrently with the SRS on the one or more second component carriers is further based on whether a user equipment (UE) is power limited from transmitting the at least one of the data or the control information concurrently with the SRS.

23. The apparatus of claim 22, wherein the means for transmitting the SRS is configured to:

transmit the SRS and the at least one of the data or the control information concurrently when the UE is not power limited; and refrain from transmitting the SRS and the at least one of the data or the control information concurrently when the UE is power limited.

24. An apparatus for wireless communication, comprising:

means for determining a number of uplink timing groups configured for a plurality of component carriers;

means for determining whether to transmit at least one of data or control information on one or more first component carriers of the plurality of component carriers concurrently with sounding reference signals (SRS) on one or more second component carriers of the plurality of component carriers based at least in part on the number of uplink timing groups; and means for transmitting information to an evolved Node B (eNB) indicating a difference between uplink timing associated with the one or more first component carriers and uplink timing associated with the one or more second component carriers.

25. An apparatus for wireless communication, comprising:

means for determining a number of uplink timing groups configured for a plurality of component carriers;

means for determining whether to transmit at least one of data or control information on one or more first component carriers of the plurality of component carriers concurrently with sounding reference signals (SRS) on one or more second component carriers of the plurality of component carriers based at least in part on the number of uplink timing groups;

means for receiving a timing advance command for at least one of the plurality of component carriers; and means for determining whether to apply the timing advance command based on a difference between uplink timing of the one or more first component carriers and uplink timing of the one or more second component carriers if the timing advance command is applied.

26. The apparatus of claim 25, wherein the timing advance command is for the one or more first component carriers, wherein the means for determining whether to apply the timing advance command is configured to:
apply the timing advance command to uplink timing of the one or more first component carriers; and
shift uplink timing of the one or more second component carriers when a difference between the uplink timing of the one or more first component carriers and the uplink timing of the one or more second component carriers is greater than a threshold,
wherein the uplink timing of the one or more second component carriers is shifted to obtain a difference between the uplink timing of the one or more first component carriers and the uplink timing of the one or more second component carriers that is less than or equal to the threshold.

27. The apparatus of claim 25, wherein the timing advance command received is for the one or more first component carriers, wherein the means for determining whether to apply the timing advance command is configured to:
apply the timing advance command to the uplink timing of the one or more first component carriers; and
shift the uplink timing of the one or more first component carriers when the difference between the uplink timing of the one or more first component carriers and the uplink timing of the one or more second component carriers is greater than a threshold, wherein the uplink timing of the one or more first component carriers is shifted to obtain a difference between the uplink timing of the one or more first component carriers and the uplink timing of the one or more second component carriers that is less or equal to the threshold.

28. The apparatus of claim 25, wherein timing advance commands for both the one or more first component carriers and for the one or more first component carriers are received, wherein the means for determining whether to apply the timing advance command is configured to:
apply the timing advance command for the one or more first component carriers to the uplink timing of the one or more first component carriers;
apply the timing advance command for the one or more second component carriers to the uplink timing of the one or more second component carriers; and
shift at least one of the uplink timing of the one or more first component carriers and the uplink timing of the one or more second component carriers, when the difference between the uplink timing of the one or more first component carriers and the uplink timing of the one or more second component carriers is greater than a threshold,
wherein the at least one of the uplink timing of the one or more first component carriers and the uplink timing of the one or more second component carriers is shifted to obtain a difference between the uplink timing of the one or more first component carriers and the uplink timing of the one or more second component carriers that is less or equal to the threshold.

29. The apparatus of claim 28, wherein only the uplink timing of the one or more second component carriers is shifted when the difference between the uplink timing of the one or more first component carriers and the uplink timing of the one or more second component carriers is greater than the threshold.

30. An apparatus for wireless communication of a user equipment (UE), comprising:
a memory; and
at least one processor coupled to the memory and configured to:
determine a number of uplink timing groups configured for a plurality of component carriers;
determine whether to transmit at least one of data or control information in a first symbol on one or more first component carriers of the plurality of component carriers concurrently with sounding reference signals (SRS) in a second symbol on one or more second component carriers of the plurality of component carriers based at least in part on the number of uplink timing groups, the second symbol overlapping with the first symbol;
transmit the at least one of the data or the control information in the first symbol; and
refrain from transmitting the SRS in the second symbol when the number of uplink timing groups is determined to be greater than or equal to two and the UE is power limited in an overlapping portion of the first and second symbols.

31. The apparatus of claim 30, wherein the number of uplink timing groups is determined based on a higher layer signaling configuration.

32. The apparatus of claim 30, wherein only one uplink timing group is determined, and wherein the processing system is configured to transmit the SRS in a symbol on the one or more second component carriers when the at least one of the data or the control information is not transmitted in the symbol on the one or more first component carriers, wherein the processing system configured to refrain from transmitting the SRS in the symbol on the one or more second component carriers when the at least one of the data or the control information is transmitted in the symbol on the one or more first component carriers.

33. The apparatus of claim 30, wherein at least two uplink timing groups are determined wherein the processing system is configured to transmit the SRS on the one or more second component carriers concurrently with at least one of data or control information on the one or more first component carriers, when the one or more first component carriers and the one or more second component carriers comprise different component carriers.

34. The apparatus of claim 33, wherein the one or more first component carriers and the one or more second component carriers are associated with a same uplink timing group.

35. The apparatus of claim 33, wherein the one or more first component carriers and the one or more second component carriers are associated with different uplink timing groups.

36. The apparatus of claim 33, wherein the processing system is configured to determine whether to transmit the at least one of the data or the control information on the one or more first component carriers concurrently with the SRS on the one or more second component carriers is further based on whether a user equipment (UE) is power limited from transmitting the at least one of the data or the control information concurrently with the SRS.

37. The apparatus of claim 36, wherein the processing system is configured to:
transmit the SRS and the at least one of the data or the control information concurrently when the UE is not power limited; and
refrain from transmitting the SRS and the at least one of the data or the control information concurrently when the UE is power limited.

38. An apparatus for wireless communication, comprising:
a memory; and at least one processor coupled to the memory and configured to:
determine a number of uplink timing groups configured for a plurality of component carriers;
determine whether to transmit at least one of data or control information on one or more first component carriers of the plurality of component carriers concurrently with sounding reference signals (SRS) on one or more second component carriers of the plurality of component carriers based at least in part on the number of uplink timing groups; and
transmit information to an evolved Node B (eNB) indicating a difference between uplink timing associated with the one or more first component carriers and uplink timing associated with the one or more second component carriers.

39. An apparatus for wireless communication, comprising:
a memory; and
at least one processor coupled to the memory and configured to:
determine a number of uplink timing groups configured for a plurality of component carriers;
determine whether to transmit at least one of data or control information on one or more first component carriers of the plurality of component carriers concurrently with sounding reference signals (SRS) on one or more second component carriers of the plurality of component carriers based at least in part on the number of uplink timing groups;
receive a timing advance command for at least one of the plurality of component carriers; and
determine whether to apply the timing advance command based on a difference between uplink timing of the one or more first component carriers and uplink timing of the one or more second component carriers if the timing advance command is applied.

40. The apparatus of claim 39, wherein the timing advance command is for the one or more first component carriers, wherein the processing system is configured to:
apply the timing advance command to uplink timing of the one or more first component carriers; and
shift uplink timing of the one or more second component carriers when a difference between the uplink timing of the one or more first component carriers and the uplink timing of the one or more second component carriers is greater than a threshold,
wherein the uplink timing of the one or more second component carriers is shifted to obtain a difference between the uplink timing of the one or more first component carriers and the uplink timing of the one or more second component carriers that is less than or equal to the threshold.

41. The apparatus of claim 39, wherein the timing advance command received is for the one or more first component carriers, wherein the processing system is configured to:
apply the timing advance command to the uplink timing of the one or more first component carriers; and
shift the uplink timing of the one or more first component carriers when the difference between the uplink timing of the one or more first component carriers and the uplink timing of the one or more second component carriers is greater than a threshold, wherein the uplink timing of the one or more first component carriers is shifted to obtain a difference between the uplink timing of the one or more first component carriers and the uplink timing of the one or more second component carriers that is less or equal to the threshold.

42. The apparatus of claim 39, wherein timing advance commands for both the one or more first component carriers and for the one or more first component carriers are received, wherein the processing system is configured to:
apply the timing advance command for the one or more first component carriers to the uplink timing of the one or more first component carriers;
apply the timing advance command for the one or more second component carriers to the uplink timing of the one or more second component carriers; and
shift at least one of the uplink timing of the one or more first component carriers and the uplink timing of the one or more second component carriers, when the difference between the uplink timing of the one or more first component carriers and the uplink timing of the one or more second component carriers is greater than a threshold,
wherein the at least one of the uplink timing of the one or more first component carriers and the uplink timing of the one or more second component carriers is shifted to obtain a difference between the uplink timing of the one or more first component carriers and the uplink timing of the one or more second component carriers that is less or equal to the threshold.

43. The apparatus of claim 42, wherein only the uplink timing of the one or more second component carriers is shifted when the difference between the uplink timing of the one or more first component carriers and the uplink timing of the one or more second component carriers is greater than the threshold.

44. A non-transitory computer-readable medium of a user equipment (UE) and comprising code that when executed on at least one processor causes the at least one processor to perform operations of:
determining a number of uplink timing groups configured for a plurality of component carriers;
determining whether to transmit at least one of data or control information in a first symbol on one or more first component carriers of the plurality of component carriers concurrently with sounding reference signals (SRS) in a second symbol on one or more second component carriers of the plurality of component carriers based at least in part on the number of uplink timing groups, the second symbol overlapping with the first symbol;
transmitting the at least one of the data or the control information in the first symbol; and
refraining from transmitting the SRS in the second symbol when the number of uplink timing groups is determined to be greater than or equal to two and the UE is power limited in an overlapping portion of the first and second symbols.

45. The non-transitory computer-readable medium of claim 44, wherein the number of uplink timing groups is determined based on a higher layer signaling configuration.

46. The non-transitory computer-readable medium of claim 44, wherein only one uplink timing group is determined, and wherein the non-transitory computer-readable medium further comprises code that when executed on the at least one processor causes the at least one processor to perform operations of:
transmitting the SRS in a symbol on the one or more second component carriers when the at least one of the data or the control information is not transmitted in the symbol on the one or more first component carriers; and
refraining from transmitting the SRS in the symbol on the one or more second component carriers when the at least one of the data or the control information is transmitted in the symbol on the one or more first component carriers.

47. The non-transitory computer-readable medium of claim 44, wherein at least two uplink timing groups are determined and further comprising transmitting SRS on the one or more second component carriers concurrently with at least one of data or control information on the one or more first component carriers, when the one or more first component carriers and the one or more second component carriers comprise different component carriers.

48. The non-transitory computer-readable medium of claim 47, wherein the one or more first component carriers and the one or more second component carriers are associated with a same uplink timing group.

49. The non-transitory computer-readable medium of claim 47, wherein the one or more first component carriers and the one or more second component carriers are associated with different uplink timing groups.

50. The non-transitory computer-readable medium of claim 47, wherein determining whether to transmit the at least one of the data or the control information on the one or more first component carriers concurrently with the SRS on the one or more second component carriers is further based on whether a user equipment (UE) is power limited from transmitting the at least one of the data or the control information concurrently with the SRS.

51. The non-transitory computer-readable medium of claim 50, wherein the non-transitory computer-readable medium further comprises code that when executed on the at least one processor causes the at least one processor to perform operations of:
transmitting the SRS and the at least one of the data or the control information concurrently when the UE is not power limited; and
refraining from transmitting the SRS and the at least one of the data or the control information concurrently when the UE is power limited.

52. A non-transitory computer-readable medium of a user equipment (UE) and comprising code that when executed on at least one processor causes the at least one processor to perform operations of:
determining a number of uplink timing groups configured for a plurality of component carriers;
determining whether to transmit at least one of data or control information on one or more first component carriers of the plurality of component carriers concurrently with sounding reference signals (SRS) on one or more second component carriers of the plurality of component carriers based at least in part on the number of uplink timing groups; and
transmitting information to an evolved Node B (eNB) indicating a difference between uplink timing associated with the one or more first component carriers and uplink timing associated with the one or more second component carriers.

53. A non-transitory computer-readable medium of a user equipment (UE) and comprising code that when executed on at least one processor causes the at least one processor to perform operations of:
determining a number of uplink timing groups configured for a plurality of component carriers;
determining whether to transmit at least one of data or control information on one or more first component carriers of the plurality of component carriers concurrently with sounding reference signals (SRS) on one or more second component carriers of the plurality of component carriers based at least in part on the number of uplink timing groups;
receiving a timing advance command for at least one of the plurality of component carriers; and
determining whether to apply the timing advance command based on a difference between uplink timing of the one or more first component carriers and uplink timing of the one or more second component carriers if the timing advance command is applied.

54. The non-transitory computer-readable medium of claim 53, wherein the timing advance command is for the one or more first component carriers, and wherein the non-transitory computer-readable medium further comprises code that when executed on the at least one processor causes the at least one processor to perform operations of:
applying the timing advance command to uplink timing of the one or more first component carriers; and
shifting uplink timing of the one or more second component carriers when a difference between the uplink timing of the one or more first component carriers and the uplink timing of the one or more second component carriers is greater than a threshold,
wherein the uplink timing of the one or more second component carriers is shifted to obtain a difference between the uplink timing of the one or more first component carriers and the uplink timing of the one or more second component carriers that is less than or equal to the threshold.

55. The non-transitory computer-readable medium of claim 53, wherein the timing advance command received is for the one or more first component carriers, and wherein the non-transitory computer-readable medium further comprises code that when executed on the at least one processor causes the at least one processor to perform operations of:
applying the timing advance command to the uplink timing of the one or more first component carriers; and
shifting the uplink timing of the one or more first component carriers when the difference between the uplink timing of the one or more first component carriers and the uplink timing of the one or more second component carriers is greater than a threshold, wherein the uplink timing of the one or more first component carriers is shifted to obtain a difference between the uplink timing of the one or more first component carriers and the uplink timing of the one or more second component carriers that is less or equal to the threshold.

56. The non-transitory computer-readable medium of claim 53, wherein timing advance commands for both the one or more first component carriers and for the one or more first component carriers are received, and wherein the non-transitory computer-readable medium further comprises code that when executed on the at least one processor causes the at least one processor to perform operations of:
applying the timing advance command for the one or more first component carriers to the uplink timing of the one or more first component carriers;
applying the timing advance command for the one or more second component carriers to the uplink timing of the one or more second component carriers; and
shifting at least one of the uplink timing of the one or more first component carriers and the uplink timing of the one or more second component carriers, when the difference between the uplink timing of the one or more first component carriers and the uplink timing of the one or more second component carriers is greater than a threshold, wherein the at least one of the uplink timing of the one or more first component carriers and the uplink timing of the one or more second component carriers is shifted to obtain a difference between the uplink timing of the one or more first component carriers and the uplink timing of the one or more second component carriers that is less or equal to the threshold.

57. The non-transitory computer-readable medium of claim 56, wherein only the uplink timing of the one or more second component carriers is shifted when the difference between the uplink timing of the one or more first component carriers and the uplink timing of the one or more second component carriers is greater than the threshold.

* * * * *